US009380151B2

(12) United States Patent
 Yui

(10) Patent No.: US 9,380,151 B2
(45) Date of Patent: Jun. 28, 2016

(54) COMMUNICATION DEVICE, COMMUNICATION SYSTEM AND COMPUTER READABLE MEDIUM

(71) Applicant: CASIO COMPUTER CO., LTD., Shibuya-ku, Tokyo (JP)

(72) Inventor: Takaaki Yui, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 62 days.

(21) Appl. No.: 13/923,209

(22) Filed: Jun. 20, 2013

(65) Prior Publication Data

US 2014/0023187 A1    Jan. 23, 2014

(30) Foreign Application Priority Data

Jul. 20, 2012 (JP) .................................. 2012-161710

(51) Int. Cl.
 H04M 1/00 (2006.01)
 H04M 3/02 (2006.01)
 H04M 3/42 (2006.01)
 H04M 7/00 (2006.01)

(52) U.S. Cl.
 CPC ............ *H04M 3/02* (2013.01); *H04M 3/42042* (2013.01); *H04M 7/0042* (2013.01); *H04M 2203/654* (2013.01)

(58) Field of Classification Search
 CPC ..................................................... H04M 15/00
 See application file for complete search history.

(56) References Cited

U.S. PATENT DOCUMENTS

| 7,725,522 | B2* | 5/2010 | Sadafale | ................. G06F 7/523 708/625 |
|---|---|---|---|---|
| 8,036,363 | B2 | 10/2011 | Sakaniwa | |
| 8,677,250 | B2* | 3/2014 | Wormald | ................. A63F 13/12 463/40 |
| 8,719,343 | B2* | 5/2014 | Kim | ....................... G06Q 30/02 709/203 |
| 9,083,770 | B1* | 7/2015 | Drose | .................... G06Q 20/14 |
| 9,094,137 | B1* | 7/2015 | Sehn | ..................... H04H 20/61 |
| 2007/0073823 | A1* | 3/2007 | Cohen | ................. G06Q 10/107 709/207 |
| 2008/0082317 | A1* | 4/2008 | Rosart et al. | ..................... 704/8 |

(Continued)

FOREIGN PATENT DOCUMENTS

| JP | 61079350 A | 4/1986 |
|---|---|---|
| JP | 2000165947 A | 6/2000 |

(Continued)

OTHER PUBLICATIONS

Japanese Office Action dated Apr. 21, 2015, issued in counterpart Japanese Application No. 2012-161710.

(Continued)

*Primary Examiner* — Joseph T Phan
(74) *Attorney, Agent, or Firm* — Holtz, Holtz & Volek PC

(57) ABSTRACT

A communication device, including a receiver specification section which specifies a receiving communication device; a control section which transmits, to the receiving communication device specified by the receiver specification section, call request information used for outputting a call request notification and deleting the call request notification after a predetermined time period; a time period setting section which sets a time period during when the call request notification is output by the receiving communication device; a message setting section which sets a call request message; and a cancel instruction section which inputs a cancel instruction of the call request notification.

10 Claims, 22 Drawing Sheets

(56) References Cited

U.S. PATENT DOCUMENTS

| | | | | |
|---|---|---|---|---|
| 2009/0177978 A1* | 7/2009 | Hagale et al. | ............... | 715/753 |
| 2011/0060839 A1* | 3/2011 | Ohta et al. | ............... | 709/229 |
| 2012/0246246 A1* | 9/2012 | Moore | ............... | 709/206 |
| 2013/0328665 A1* | 12/2013 | Cranfill et al. | ............... | 340/7.55 |

FOREIGN PATENT DOCUMENTS

| | | |
|---|---|---|
| JP | 2003-116165 A | 4/2003 |
| JP | 2007281606 A | 10/2007 |
| JP | 2007306429 A | 11/2007 |
| JP | 2008236118 A | 10/2008 |
| JP | 2012015850 A | 1/2012 |

OTHER PUBLICATIONS

Japanese Office Action (and English translation thereof) dated Jan. 12, 2016, issued in counterpart Japanese Application No. 2012-161710.

* cited by examiner

| NUMBER | TEXT |
|---|---|
| 1 | ARE YOU FREE NOW? |
| 2 | CALL ME AS SOON AS POSSIBLE! |
| 3 | CALL ME IF YOU LIKE! |
| 4 | GIVE ME A CALL! |
| 0 | |

| SENT TIME | MESSAGE NUMBER | RECIPIENT'S PHONE NUMBER | DISPLAY END TIME |
|---|---|---|---|
| 10/10 10:00 | 1 | 03-1234-5678 | 10/10 11:00 |
| 10/15 13:30 | 3 | 042-987-6543 | 10/15 14:30 |
| | | | |
| | | | |

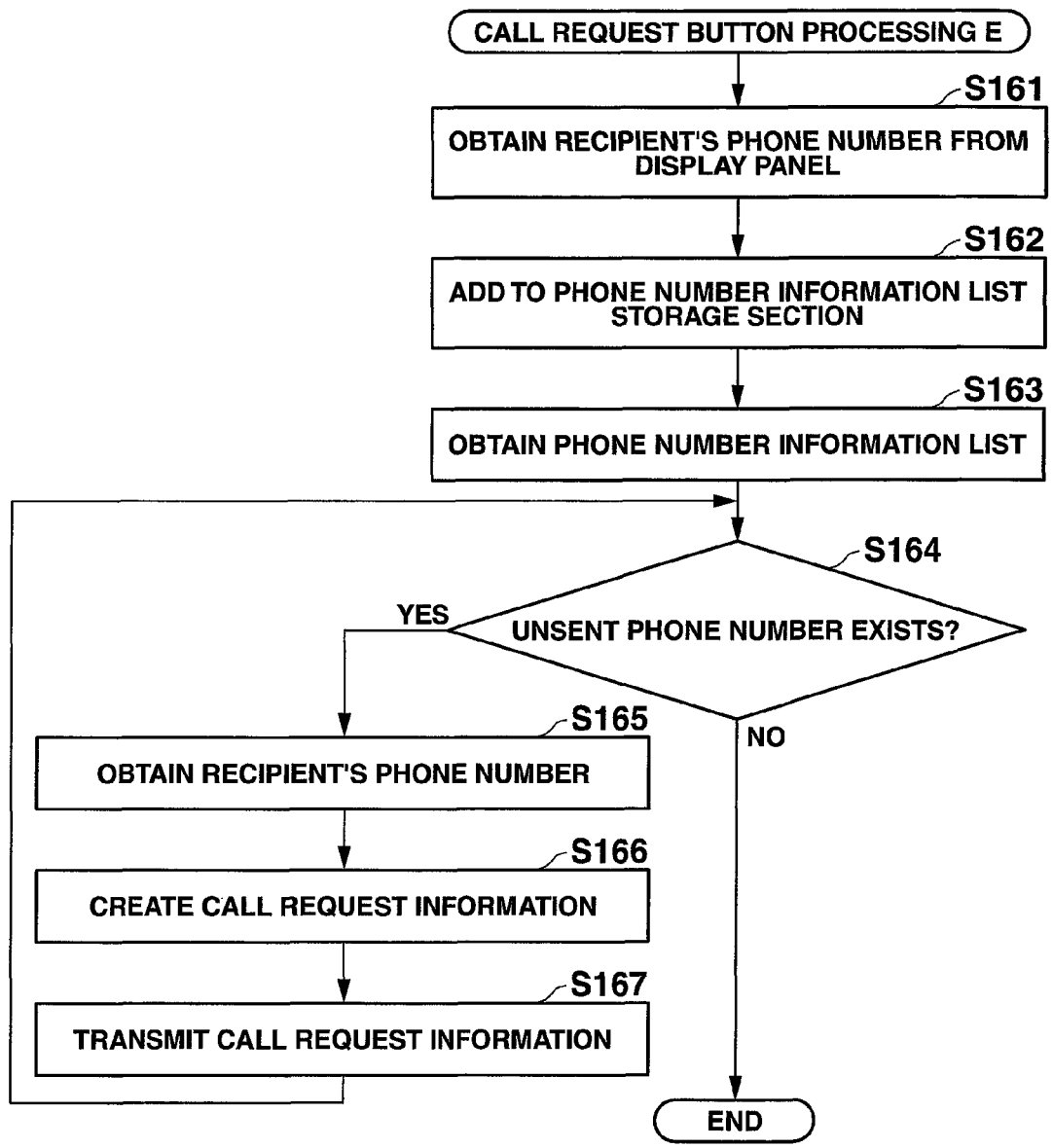

COMMUNICATION DEVICE, COMMUNICATION SYSTEM AND COMPUTER READABLE MEDIUM

BACKGROUND OF THE INVENTION

1. Field of the Invention

The present invention relates to a communication device, a communication system and a computer readable medium.

2. Description of Related Art

Conventionally, in an attempt to enjoy a telephone conversation, whether the other party is busy cannot be confirmed without actually calling to ask for his/her convenience. This has been inconvenient when a caller wants to enjoy conversations casually. In addition, in order to confirm the convenience of the other party before calling, the caller has been required to carry out troublesome work such as sending a confirmation e-mail in advance.

For example, the Patent document 1 (Japanese Patent Application Laid Open Publication No. 2003-116165) describes a technique in which presence information indicating a current mood and a condition such as free/busy of a caller is output to the call receiving terminal. In the call receiving terminal, output is carried out by modulating musical tone or such like of the incoming call according to the presence information to inform the other party of the caller's condition.

However, the technique of the Patent document 1 does not consider the condition of the other party though the calling party can tell his/her own condition to the other party. Further, the setting of the caller's current condition (presence information) needs to be updated in each case, and thus the technique is not practical.

In addition, there have been known telephones which have systems for notifying received calls, and telephones which have answering machine functions. However, both types of telephones merely indicate called history. The other party cannot distinguish between a call intended for enjoying a conversation in the caller's free time and a call for urgent business. Therefore, there have been cases where the other party is forced to return the call.

SUMMARY OF THE INVENTION

An object of the present invention is to make it possible to notify the other party that a caller wishes to talk on the phone with him/her, without bothering the other party.

In order to achieve the above object, according to one aspect of the present invention, there is provided a communication device, including a receiver specification section which specifies a receiving communication device; and a control section which transmits, to the receiving communication device specified by the receiver specification section, call request information used for outputting a call request notification and deleting the call request notification after a predetermined time period.

According to the present invention, it is possible to notify the other party that the caller wishes to talk on the phone with him/her, without bothering the other party.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein:

FIG. 18 is a diagram illustrating a data storage example of a message transmission history storage section:

FIG. 25 is a flowchart showing call request button processing E which is executed by the transmitting communication device in the fifth embodiment.

DETAILED DESCRIPTION OF THE PREFERRED EMBODIMENT

Hereinafter, a preferred embodiment according to the present invention will be described in detail with reference to the accompanying drawings. The present invention is not limited to the illustrated examples.

First Embodiment

First, a configuration of the first embodiment will be described.

Figure 1:
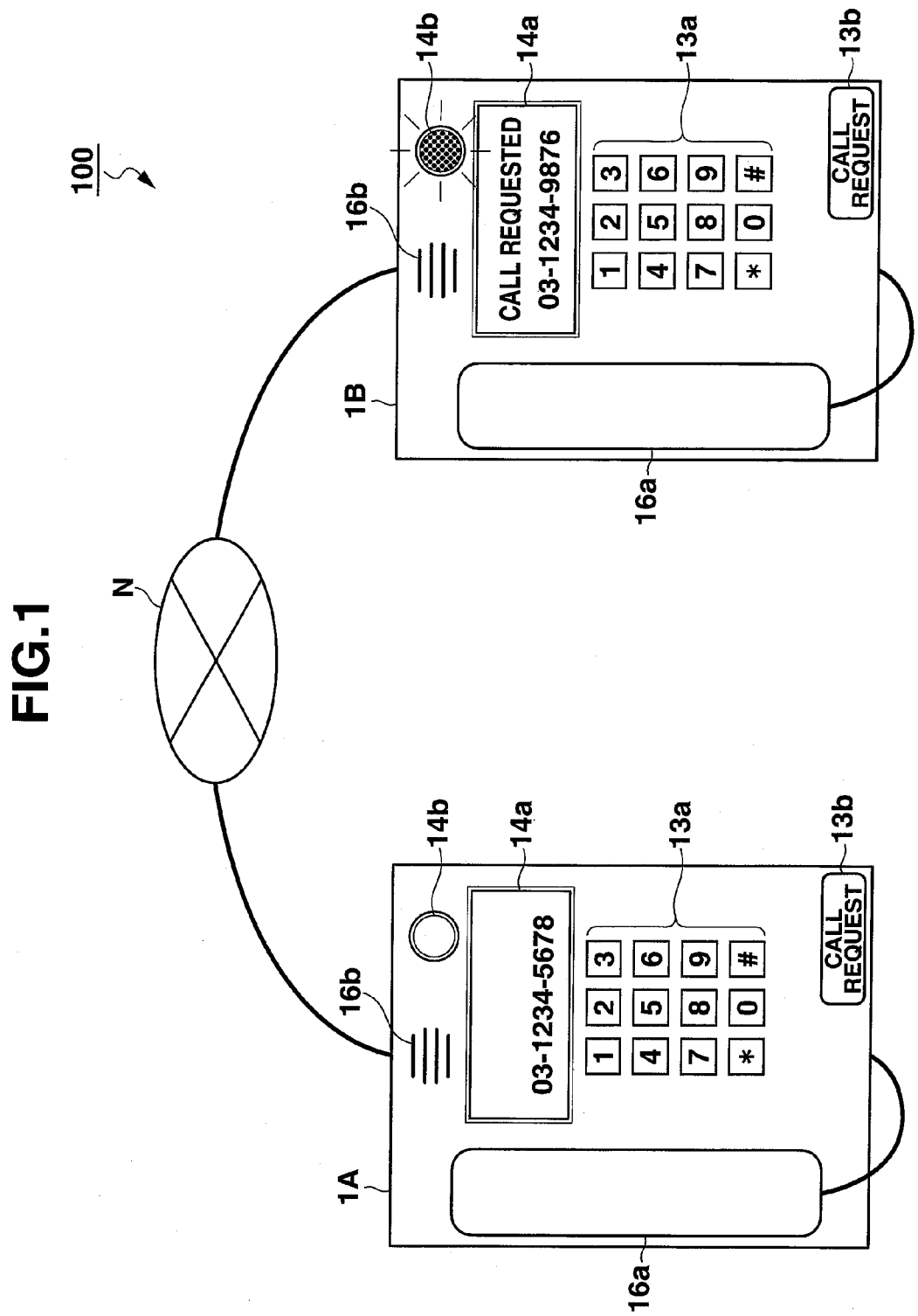
FIG. 1 is a diagram illustrating an entire configuration example of a communication system in a first embodiment.

FIG. 1 is a diagram illustrating an entire configuration of a communication system 100 in the first embodiment.

The communication system 100 is configured so that a telephone 1A and a telephone 1B can be connected to each other via a communication network N.

Though the embodiment describes the telephones 1A and 1B as fixed line phones and the communication network N as a public phone network including lines, a circuit switch, a transit exchange and such like, the present invention is not limited to this. For example, the telephones 1A and 1B may be other communication devices such as IP (Internet Protocol) phones, cellular phones, PHS (Personal Handy-phone System) and smartphones, and the communication network N may be another network such as Internet, a mobile communication network and an ISDN line.

Figure 2:
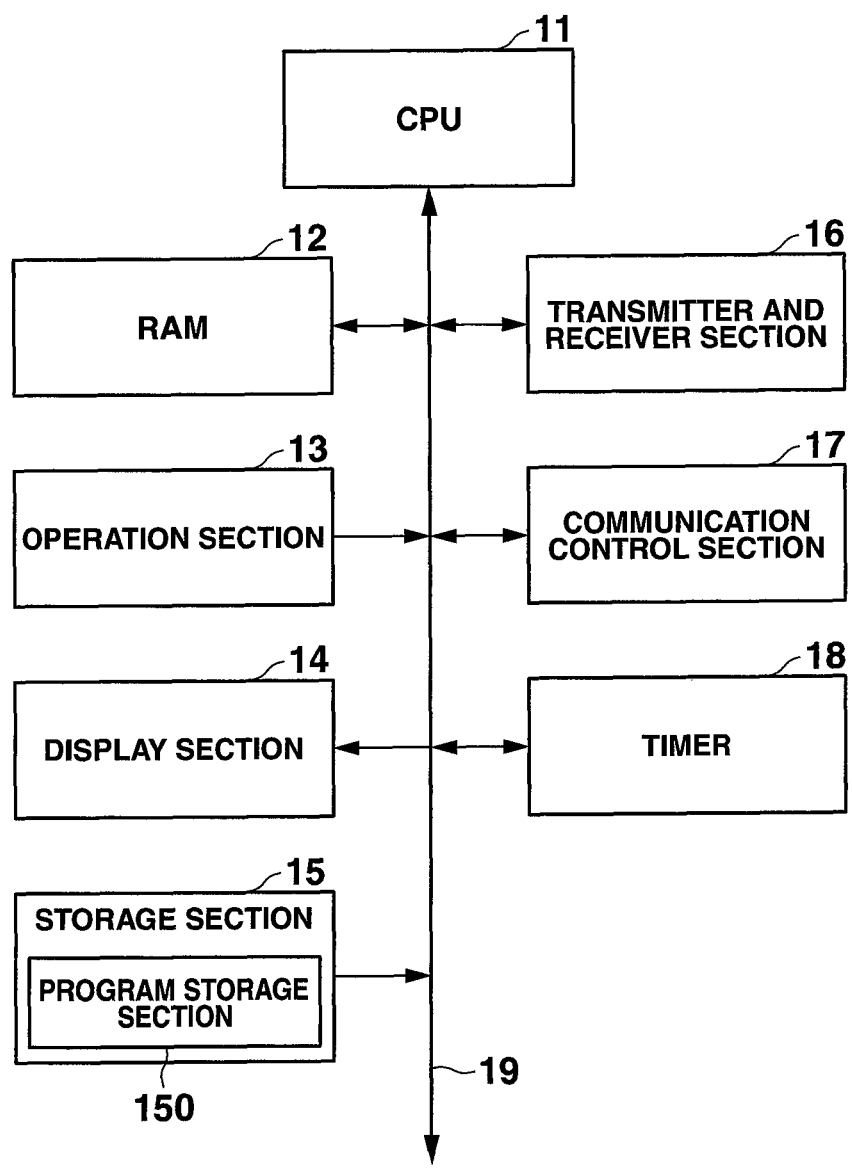
FIG. 2 is a block diagram illustrating a functional configuration of a communication device.

FIG. 2 is a block diagram illustrating a functional configuration of the telephones 1A and 1B.

As shown in FIG. 2, each of the telephones 1A and 1B is configured by including a CPU (Central Processing Unit) 11, a RAM (Random Access Memory) 12, an operation section 13, a display section 14, a storage section 15, a transmitter and receiver section 16, a communication control section 17 and a timer 18. The sections are connected to each other via a bus 19. The telephones 1A and 1B have the same configuration and functions.

The CPU 11 reads out a system program stored in the storage section 15, loads the system program into a work area of the RAM 12 and controls the sections according to the system program. Also, the CPU 11 functions as a control section and a call request transmitting section by reading out a processing program 15a (not shown in the drawings) stored in the storage section 15, loading the processing program 15a into the work area and executing each processing according to an after-mentioned call operation and a call request notification operation.

The RAM 12 is a volatile memory. The RAM 12 includes the work area to store various programs to be executed, and data and such like according to the various programs.

The operation section 13, as shown in FIG. 1, includes a dial button group 13a as a receiver specification section, a call request button 13b and such like. The operation section 13 accepts input of each button pushed by a user, and outputs the operation information to the CPU 11.

The display section 14 is configured by including a display panel 14a, a call request display device 14b and such like. The display panel 14a includes a LCD (Liquid Crystal Display) and such like, and displays a recipient's phone number, an incoming phone number and such like in accordance with a display control signal from the CPU 11. The call request display device 14b performs display with an LED (Light Emitting Diode) and such like, and notifies the user of an incoming call which is based on the call request button 13b, by lighting in accordance with the control signal from the CPU 11.

The storage section 15 is configured by including a HDD (Hard Disk Drive) which has a magnetic recording medium, a non-volatile semiconductor memory and such like. The storage section 15 is provided with a program storage section 150 as shown in FIG. 2.

In the program storage section 150, the system program and the processing program 15a to be executed by the CPU 11, data necessary for executing the programs and such like are stored. The processing program 15a includes a program for executing processing such as after-mentioned call request button processing and call request notification display processing. These programs are stored in the program storage section 150 in a form of computer-readable program code. The CPU 11 sequentially executes operations according to the program code.

The transmitter and receiver section 16 includes a receiver 16a which is equipped with a microphone and a speaker (not shown in the drawings), a speaker 16b for outputting ringtones, and such like. The receiver 16a is provided with a call path switch (not shown in the drawings), which forms a line loop when the user performs an off-hook operation.

The communication control section 17 performs communication of a call signal and a control signal with the other telephone connected to the communication network N.

The timer 18 counts remaining time of a set time, and outputs a notification signal to the CPU 11 when the set time has elapsed since the start of time measurement.

Next, operations of the communication system 100 will be described.

The communication system 100 enables conventional call operations and call request operations of outputting the call request notification for notifying the other party of the call request at the telephone of the other party.

In the telephone 1A or 1B, when dial buttons in the dial button group 13a are pushed to input a recipient's phone number, the input recipient's phone number is displayed on the display panel 14a of the display section 14. FIG. 1 shows the telephone 1A in a state of displaying the phone number on the display panel 14a.

In the state of the display panel 14a of the telephone 1A shown in FIG. 1, when the receiver 16a is held up (the off-hook operation is performed), a call operation is carried out. That is, the displayed recipient's phone number is transmitted to the communication network N by the communication control section 17 and connected to the telephone of the phone number (the recipient's phone number). If the off-hook operation is performed at the telephone of the call recipient, connection can be made.

Also, when the call request button 13b is pushed in the state of the display panel 14a of the telephone 1A shown in FIG. 1, a call request notification operation is performed. The call request notification operation is an operation of displaying a call request notification on the telephone of the recipient when the caller wants to talk if the recipient has time though the caller does not know the recipient's condition.

Hereinafter, the call request notification operation will be described.

(Processing on the Transmitting Side)

Figure 3:
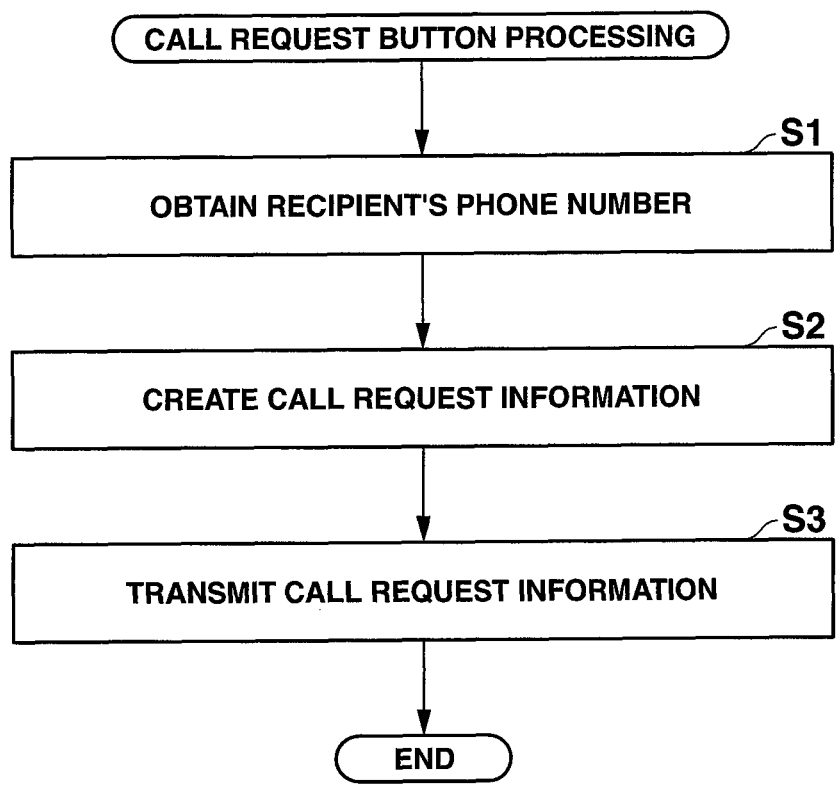
FIG. 3 is a flowchart showing call request button processing which is executed by a transmitting communication device in the first embodiment.

FIG. 3 is a flowchart showing operations of the call request button processing which is executed by the CPU 11 when the call request button 13b is pushed after the input of the recipient's phone number via the dial button group 13a at the telephone 1A or 1B. The call request button processing is executed in cooperation between the CPU 11 and the processing program 15a.

When the call request button 13b is pushed, the recipient's phone number displayed on the display panel 14a is obtained (step S1).

Next, call request information for displaying the call request notification on the recipient's telephone for a predetermined time period is created (step S2). The call request information is transmitted to the recipient's phone number via the communication network N by the communication control section 17 (step S3).

In step S3, specifically, the recipient's phone number and the call request information are transmitted as a signal to the line of the communication network N by the communication control section 17. When the signal reaches the circuit switch, the source phone number (sender's phone number) is identified and added to the call request information, and the call request information is transmitted to the recipient's phone number.

(Processing on the Receiving Side)

Next, processing which is executed at the telephone 1A or 1B when the call request information is received will be described.

Figure 4:
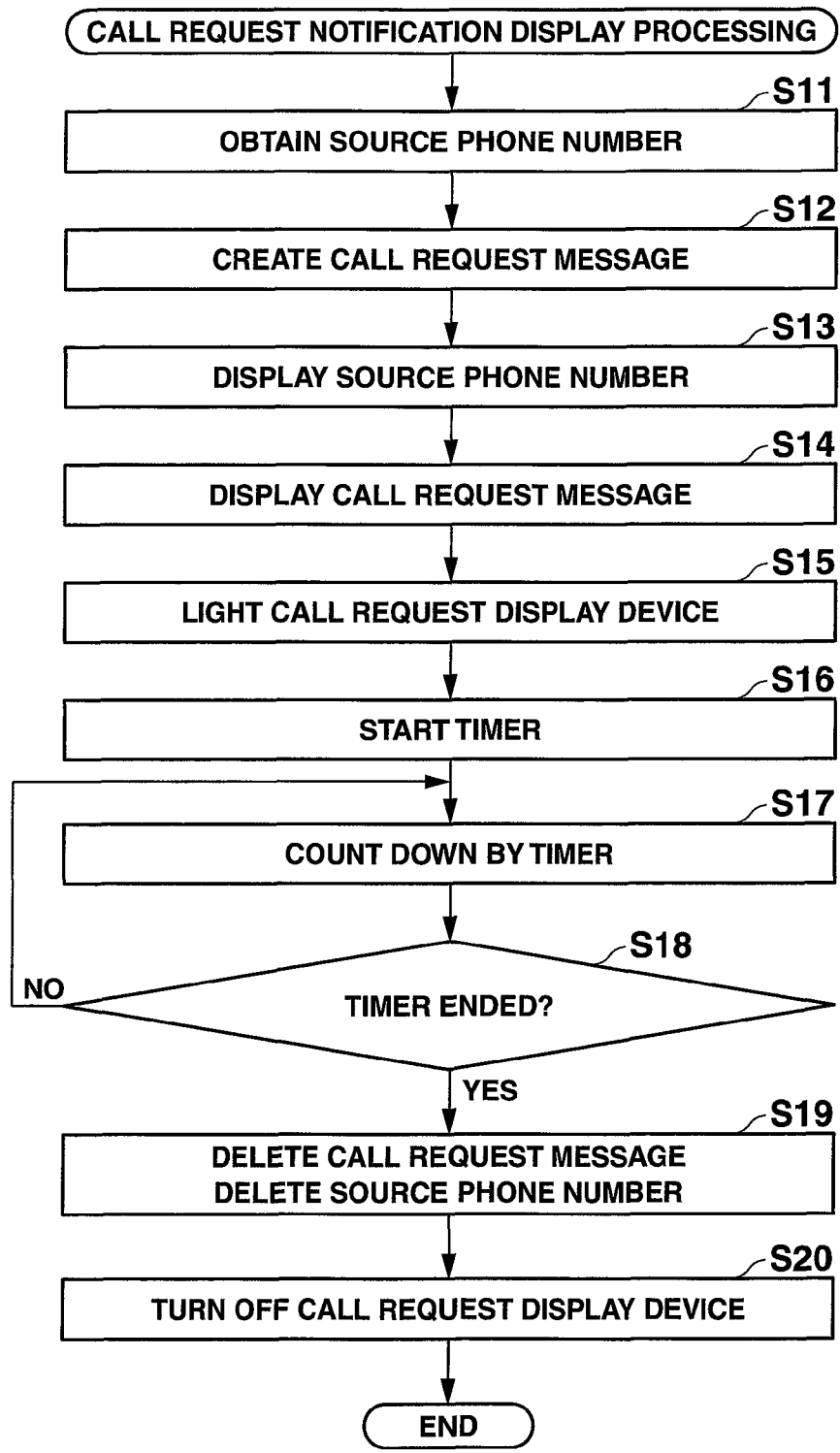
FIG. 4 is a flowchart showing call request notification display processing which is executed by a receiving communication device in the first embodiment.

FIG. 4 is a flowchart showing operations of call request notification display processing which is executed by the CPU 11 when the call request information from the other telephone is received by the communication control section 17 at the telephone 1A or 1B. The call request notification display processing is executed in cooperation between the CPU 11 and the processing program 15a.

First, the source phone number which is added to the received call request information is obtained (step S11).

Next, a call request message is created (step S12). As the call request information is formed in predetermined codes or such like, a text (here, the text of "call requested") of the call request message which is understandable to the user is created.

The source phone number obtained in step S11 is displayed on the display panel 14a of the display section 14 (step S13). The created call request message is displayed on the display panel 14a (step S14). Further, the call request display device 14b is lighted (step S15).

The telephone 1B of FIG. 1 is in a state where the source phone number and the call request message are displayed on the display panel 14a in steps S13 to 14 and the call request display device 14b is lighted in step S15. These call request message, source phone number and lighting of the call request display device 14b are the call request notification for notifying that a phone call is requested.

Next, a predetermined time period (display time of the call request notification) is set on the timer 18 and time measurement is started (step S16). Countdown is performed at regular intervals (step S17). When the set display time has elapsed and a notification signal notifying the end of the time counting operation is output from the timer 18 (step S18; YES), the call request message and the source phone number are deleted from the display panel 14a (step S19). Also, the light of the call request display device 14b is turned off (step S20), and the call request notification display processing ends.

If the off-hook operation is performed during the display time of the call request message and such like, the CPU 11 as a transmitting section may control the communication control section 17 so as to automatically accept the call of the source phone number.

As described above, according to the first embodiment, at the telephone 1A or 1B on the transmitting side as the first communication device, the recipient's phone number is input by pushing the dial buttons 13a. Thereafter, when the call request button 13b is pushed, the CPU 11 of the telephone 1A or 1B on the transmitting side transmits the call request information to the recipient's phone number by the communication control section 17. At the telephone 1A or 1B on the receiving side as the second communication device, when the call request information is received by the communication control section 17, the CPU 11 displays the call request notification on the display section 14 for the predetermined display time. When the predetermined display time has elapsed, the CPU 11 of the telephone 1A or 1B on the receiving side deletes the display of the call request notification. That is, the CPU 11 ends the display of call request notification.

Therefore, the user can easily communicate his/her desire to call to the other party without actually calling or transmitting an e-mail in advance. Further, when the predetermined time period has elapsed, the call request notification is deleted. Since the history is not left like a phone message and a call register function, the user can communicate his/her wish to call without bothering the other party.

Also, the recipient can easily know the existence of a person who wishes to call, and can talk on the phone in response to the call request only when it is convenient.

Second Embodiment

Next, the second embodiment will be described.

In the first embodiment, the time period to display the call request notification is fixed. However, when the sender (caller) intends to go out in an hour, for example, it is preferable that the call request notification is displayed on the receiving side only for one hour during the time the sender can talk on the phone. Thus, in the second embodiment, a function of setting the display time of the call request notification on the transmitting side is added so that the sender can set the display time of the call request notification.

Figure 5:
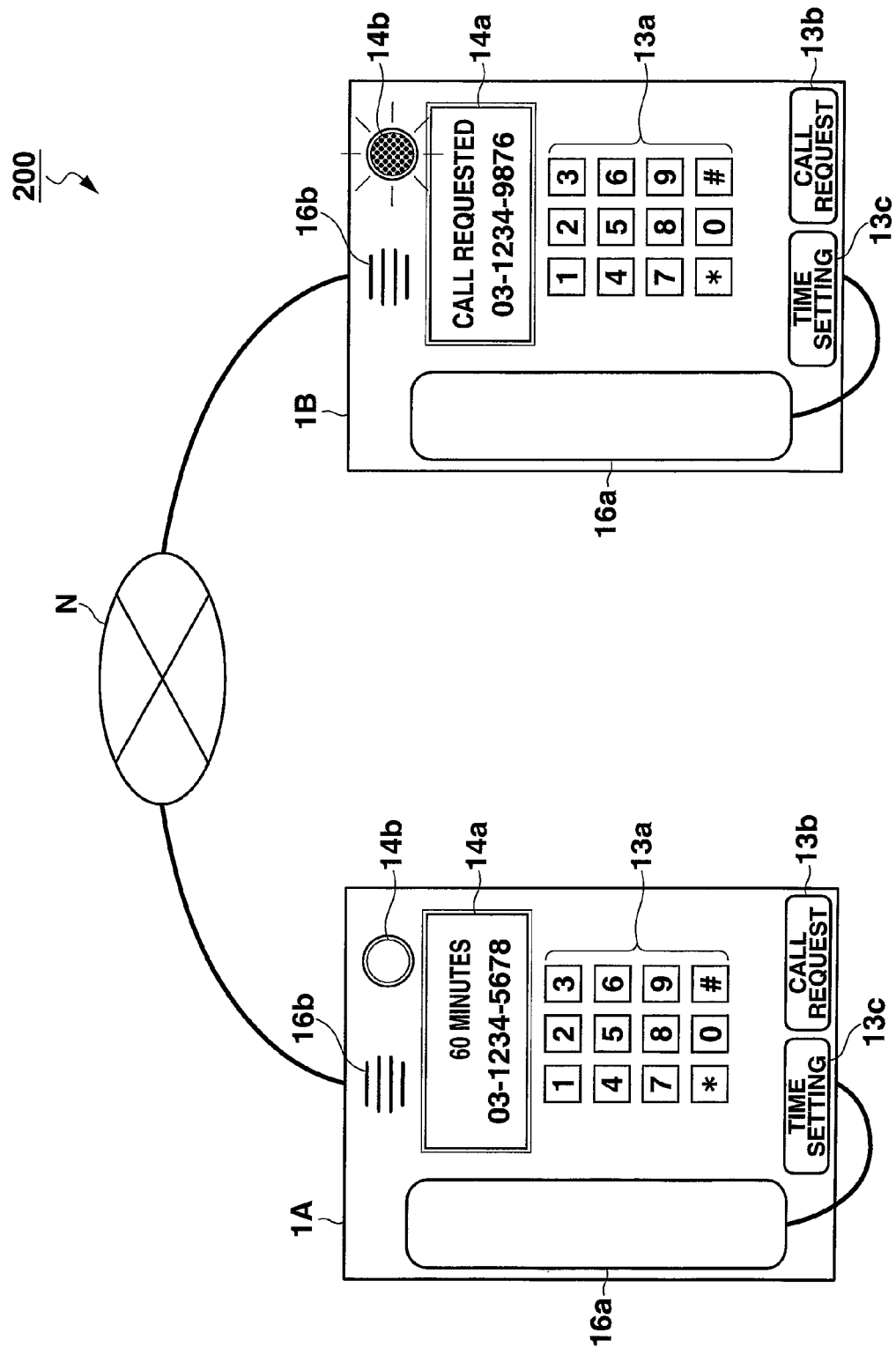
FIG. 5 is a diagram illustrating an entire configuration example of a communication system in a second embodiment.

FIG. 5 is a diagram illustrating the entire configuration of a communication system 200 in the second embodiment.

As shown in FIG. 5, in the communication system 200, the operation section 13 of each of the telephones 1A and 1B includes a time setting button 13c as a time setting section.

Also, in the program storage section 150 of the storage section 15, a processing program 15b (not shown in the drawings) is stored in addition to the system program. The CPU 11, in cooperation with the processing program 15b, executes a call operation and each processing (see FIGS. 6 to 9) according to an after-mentioned call request notification operation and functions as a control section and a call request transmitting section.

Further, the storage section 15 includes a display time setting storage section which is not shown in the drawings.

The other configurations of the communication system 200 are the same as those described in the first embodiment, and thus the explanation thereof is omitted.

Next, operations of the communication system 200 in the second embodiment will be described.

The call operation in the communication system 200 is the same as that of the first embodiment, and thus the explanation thereof is omitted. Hereinafter, the call request notification operation will be described.

Figure 6:
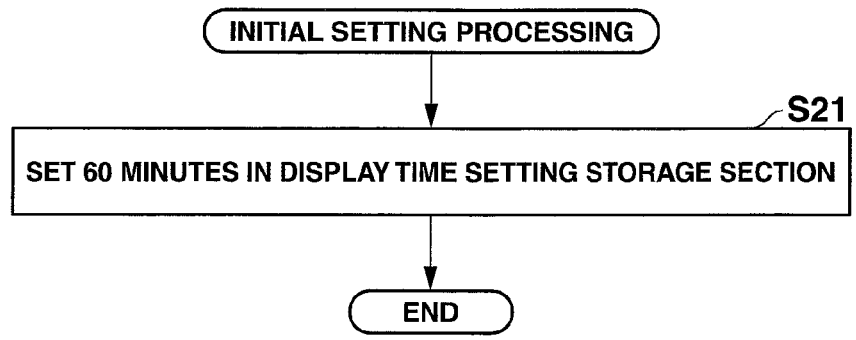
FIG. 6 is a flowchart showing initial setting processing which is executed by a communication device in the second embodiment.

As a precondition of the call request notification operation, at each of the telephones 1A and 1B, initial setting processing shown in FIG. 6 is executed by the CPU 11 when the power is turned on.

In the initial setting processing, a default display time (here, 60 minutes) for displaying the call request notification on the other telephone is stored as display time setting information in the display time setting storage section of the storage section 15 (step S21).

(Processing on the Transmitting Side)

At the telephone 1A or 1B in the second embodiment, first, a user on the transmitting side pushes the time setting button 13C to set the display time. Then, the user inputs the recipient's phone number and pushes the call request button 13b. Thereby, the user can set the display time of the call request notification on the phone at the recipient's phone number to be a desired time.

Figure 7:
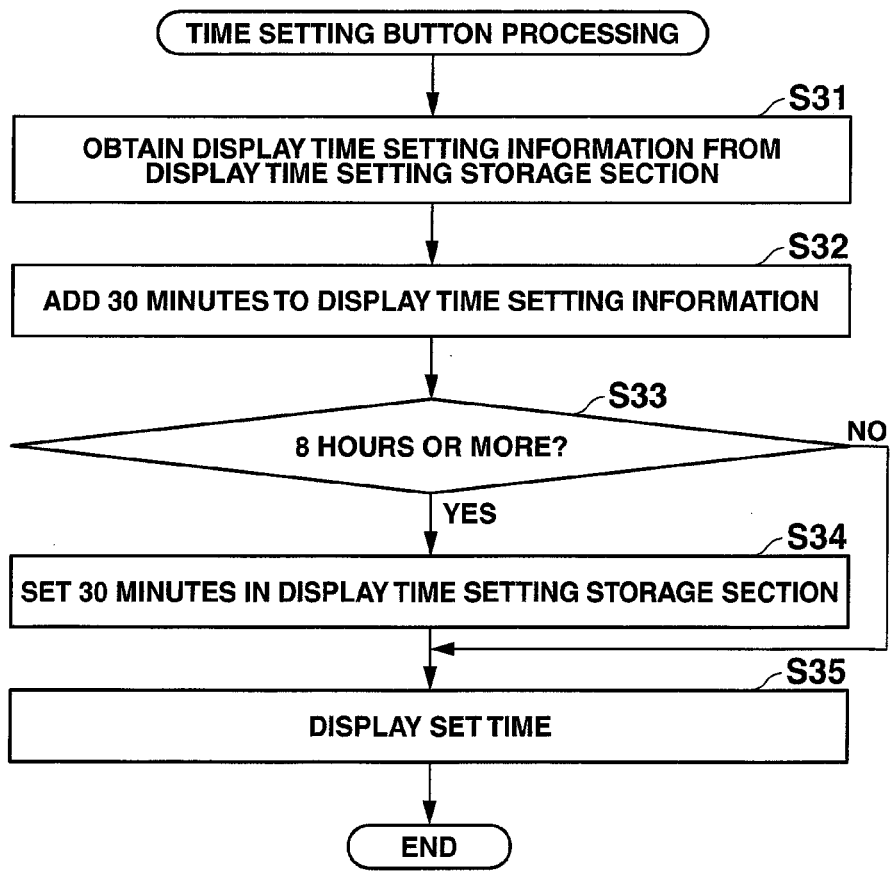
FIG. 7 is a flowchart showing time setting button processing which is executed by a transmitting communication device in the second embodiment.

FIG. 7 is a flowchart showing operations of the time setting button processing which is executed by the CPU 11 each time the time setting button 13C is pushed.

First, the display time setting information is obtained from the display time setting storage section of the storage section 15 (step S31).

Next, 30 minutes is added to the display time setting information in the display time setting storage section (step S32). Whether the display time setting information is over eight hours as a result of the addition is determined, and if the display time setting information is not determined to be eight hours or more (step S33; NO), the display time setting information is displayed on the display panel 14a (step S35).

On the other hand, if the display time setting information is determined to be eight hours or more (step S33; YES), 30 minutes is set as the display time setting information in the display time setting storage section (step S34). Then, the display time setting information is displayed on the display panel 14a (step S35).

In step S35, as shown in the telephone 1A of FIG. 5, current setting of the display time of the call request notification is displayed in the upper part of the display panel 14a.

In the above time setting button processing, 30 minutes is added to the display time stored in the display time setting storage section each time the time setting button 14c is pushed. The display time is returned to 30 minutes when the set display time exceeds eight hours. The default display time, upper limit of the display time, the amount of time to increase the display time, and such like are examples and the present invention is not limited to this. For example, the display time may be directly specified by the dial buttons 13a.

Next, processing when the call request button 13b is pushed will be described.

Figure 8:
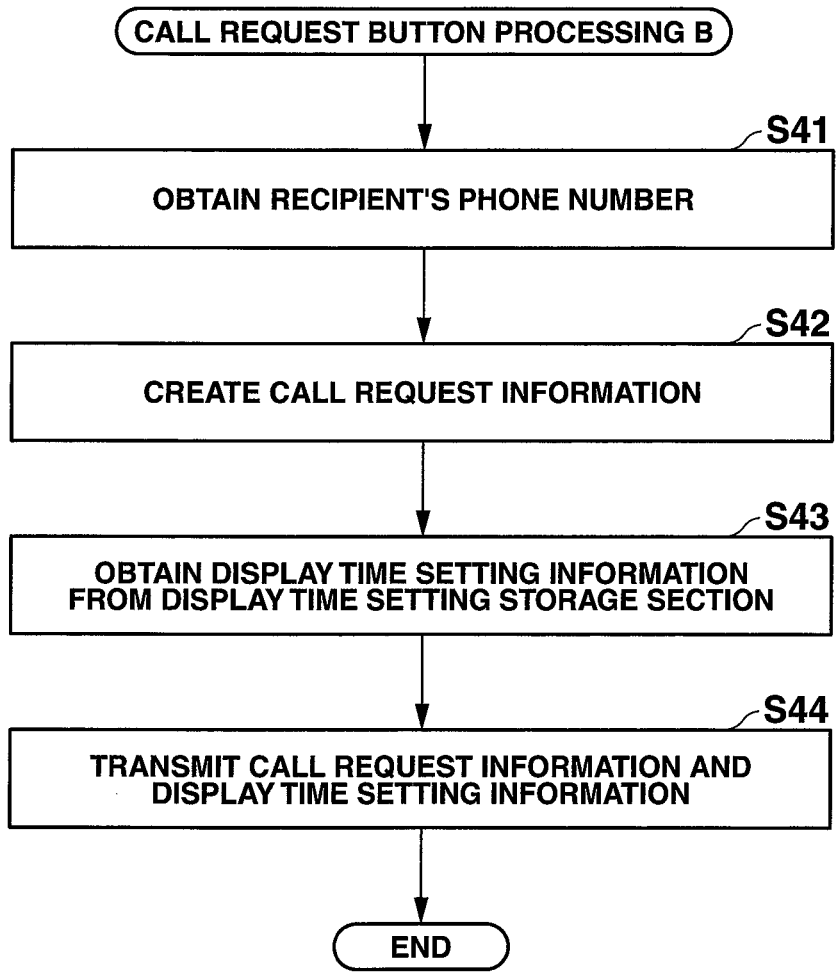
FIG. 8 is a flowchart showing call request button processing B which is executed by the transmitting communication device in the second embodiment.

FIG. 8 is a flowchart showing operations of the call request button processing B which is executed by the CPU 11 when the call request button 13b is pushed after the input of the recipient's phone number via the dial button group 13a at the telephone 1A or 1B.

As shown in the telephone 1A of FIG. 5, when the recipient's phone number is input by the dial button group 13a, the input phone number is displayed in the lower part of the display panel 14a. The display time setting information is displayed in the upper part of the display panel 14a so that the display time of the call request notification can be confirmed.

In the call request button processing B, first, the recipient's phone number displayed on the display panel 14a is obtained (step S41).

Next, the call request information for displaying the call request notification on the recipient's telephone for the predetermined time period is created (step S42).

Next, the display time setting information is obtained from the display time setting storage section of the storage section 15 (step S43). The call request information and the display time setting information are transmitted to the recipient's phone number via the communication network N by the communication control section 17 (step S44). The display time setting information is information of instructing the time for displaying the call request notification to the recipient's telephone.

In step S44, specifically, the recipient's phone number, the call request information and the display time setting information are transmitted as a signal to the line of the communication network N by the communication control section 17. When the signal reaches the circuit switch, the source phone number of the signal is identified therein. A signal obtained by adding the display time setting information and the source phone number to the call request information is transmitted to the recipient's phone number.

(Processing on the Receiving Side)

Next, the processing which is executed at the telephone 1A or 1B when receiving the call request information will be described.

Figure 9:
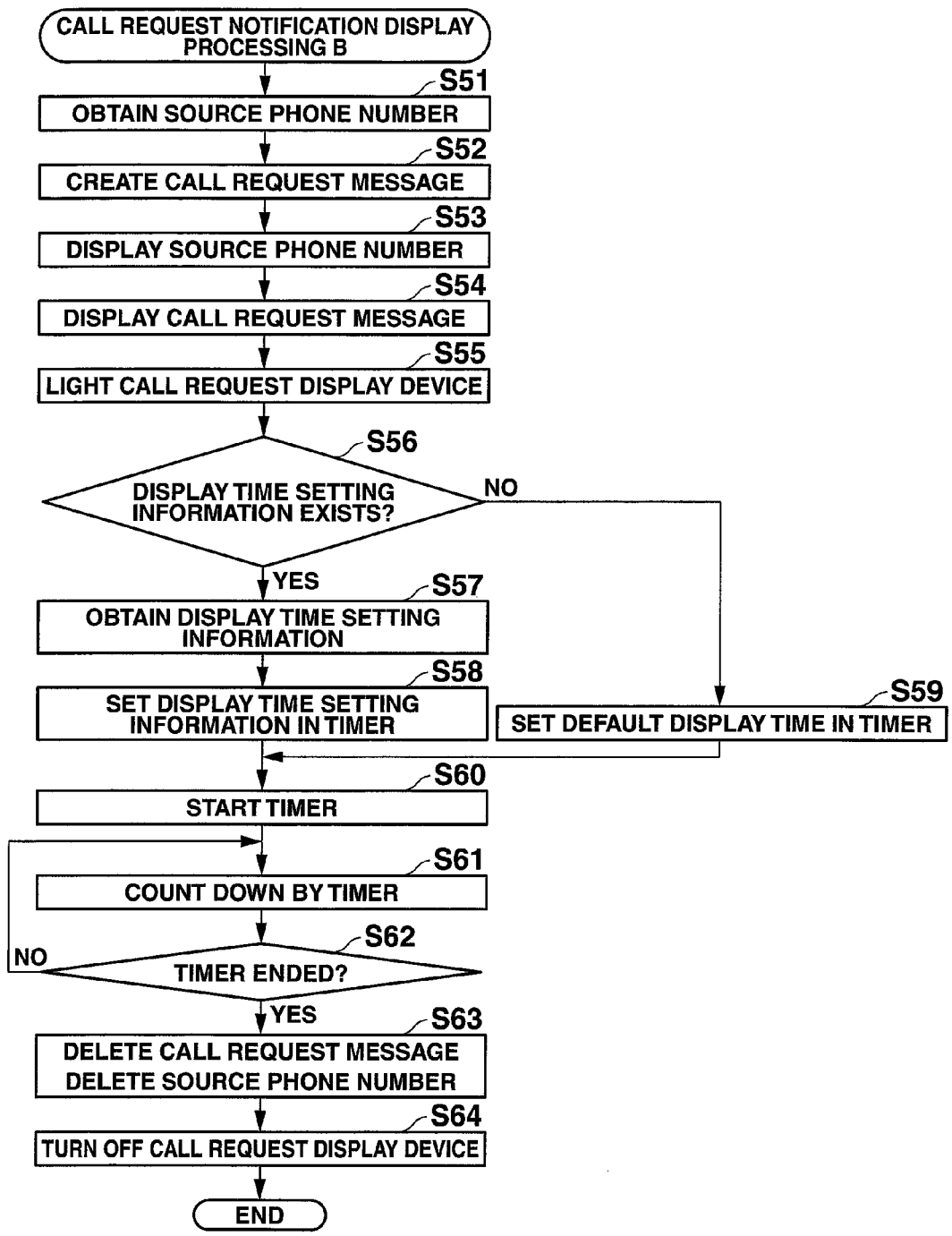
FIG. 9 is a flowchart showing call request notification display processing B which is executed by a receiving communication device in the second embodiment.

FIG. 9 is a flowchart showing operations of the call request notification display processing B which is executed by the CPU 11 of the telephone 1A or 1B when receiving the call request information by the communication control section 17.

First, the source phone number which is added to the received call request information is obtained (step S51).

Next, the call request message is created (step S52). Since the call request information is formed in predetermined codes and such like, a call request message (here, the text of "call requested") which is understandable to the user is created.

Next, the source phone number obtained in step S51 is displayed in the lower part of the display panel 14a of the display section 14 (step S53). The call request message is displayed in the upper part of the display panel 14a (step S54). Further, the call request display device 14b is lighted (step S55).

FIG. 5 shows the telephone 1B in a state where the source phone number and the call request message are displayed on the display panel 14a in steps S53 to S54 and the call request display device 14b is lighted in step S55.

Next, whether the display time setting information is added to the call request notification information is determined (step S56). If the display time setting information is determined to be added to the call request notification information (step S56; YES), the display time setting information is obtained (step S57). The display time setting information is set to the timer 18 (step S58), and the processing shifts to step S60.

On the other hand, if the display time setting information is not determined to be added to the call request notification information (step S56; NO), the default display time is set to the timer 18 (step S59) and the processing shifts to step S60.

Time measurement by the timer 18 is started (step S60) and the countdown is performed at regular intervals (step S61). When the set display time has elapsed and the notification signal notifying the end of the time counting operation is output from the timer 18 (step S62; YES), the call request message and the source phone number are deleted from the display panel 14a (step S63). Also, the light of the call request display device 14b is turned off (step S64), and the call request notification display processing B ends.

As described above, according to the second embodiment, at the telephone 1A or 1B on the transmitting side as the first communication device, the display time of the call request notification on the receiving side is set by operating the time setting button 13c. Thereafter, when the call request button 13b is pushed, the CPU 11 of the telephone 1A or 1B on the transmitting side adds the set display time setting information to the call request information and transmits the information to the recipient's telephone as the second communication device by the communication control section 17. At the recipient's telephone, upon receiving the display time setting information together with the call request information, the CPU 11 displays the call request notification on the display section 14 only for the display time indicated by the display time setting information. When the display time has elapsed, the CPU 11 of the recipient's telephone deletes the display of the call request notification. That is, the CPU 11 ends the display of the call request notification.

Accordingly, the display time of the call request notification on the recipient's telephone can be controlled by the sender's telephone. For example, when the sender intends to go out in an hour, the call request notification can be displayed on the receiving side for only one hour when the sender can talk on the phone, and thus the convenience is improved.

Third Embodiment

Next, the third embodiment will be described.

In the first and second embodiments, the call request message displayed on the recipient's telephone is a fixed message such as "call requested". However, if the call request message can be changed to "Are you free now?" and "Call me as soon as possible!" in accordance with the situation of the sender, for example, the situation of the sender can be communicated to the recipient and the convenience is more improved.

Thus, in the third embodiment, the function of setting the call request message to be displayed on the telephone on the receiving side is added so that the recipient can know the situation of the sender.

Figure 10:
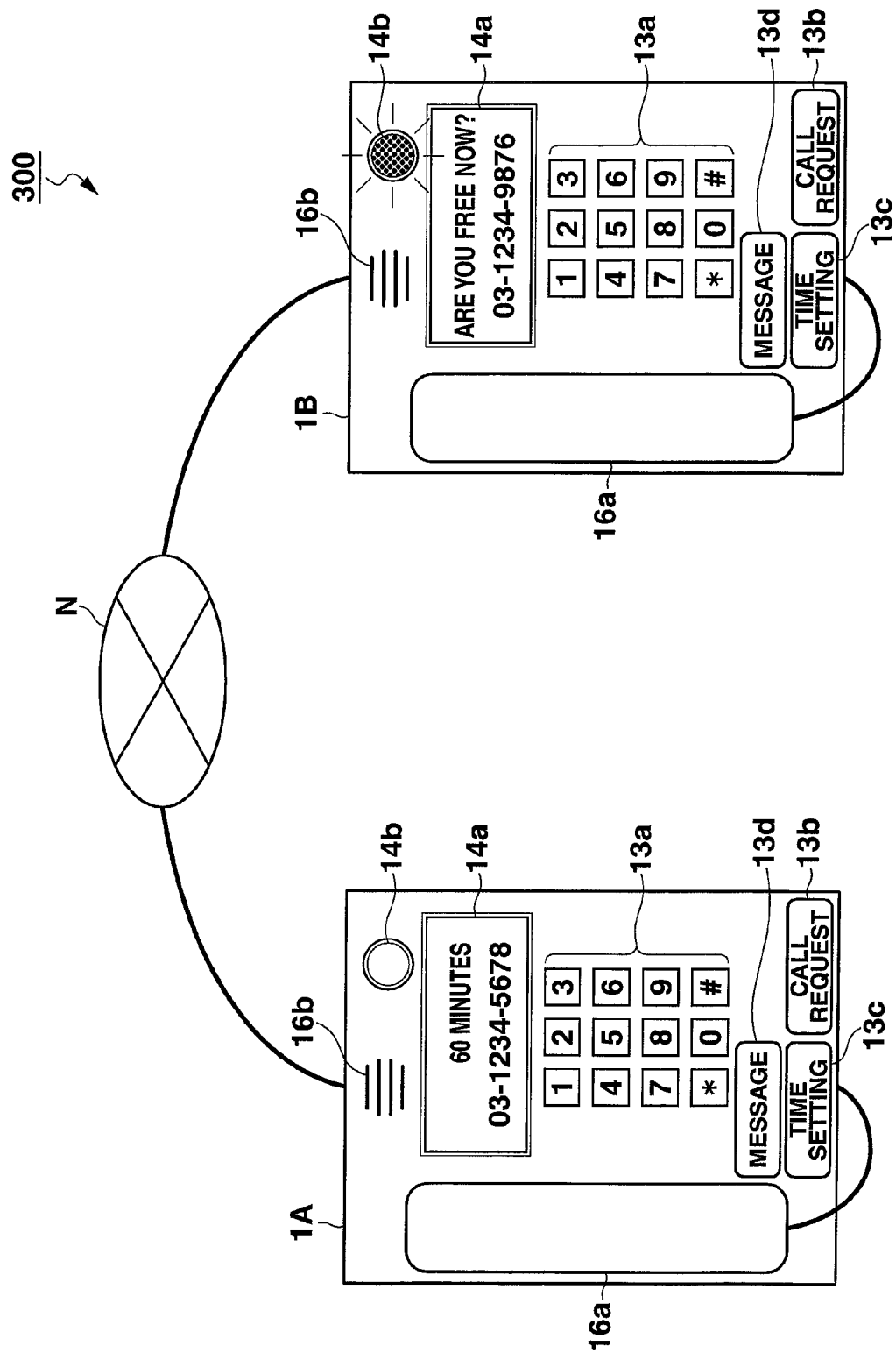
FIG. 10 is a diagram illustrating an entire configuration example of a communication system in a third embodiment.

FIG. 10 is a diagram illustrating the entire configuration of a communication system 300 in the third embodiment.

As shown in FIG. 10, in the communication system 300, the operation section 13 of each of the telephones 1A and 1B includes a message button 13d as a message setting section.

In the program storage section 150 of the storage section 15, a processing program 15c which is not shown in the drawings is stored in addition to the system program. The CPU 11, in cooperation with the processing program 15c, executes the call operation and each processing (see FIGS. 12 to 16) according to an after-mentioned call notification operation, and functions as a control section and a call request transmitting section.

Also, a message table 151 is stored in the storage section 15.

Figures 11, 12:
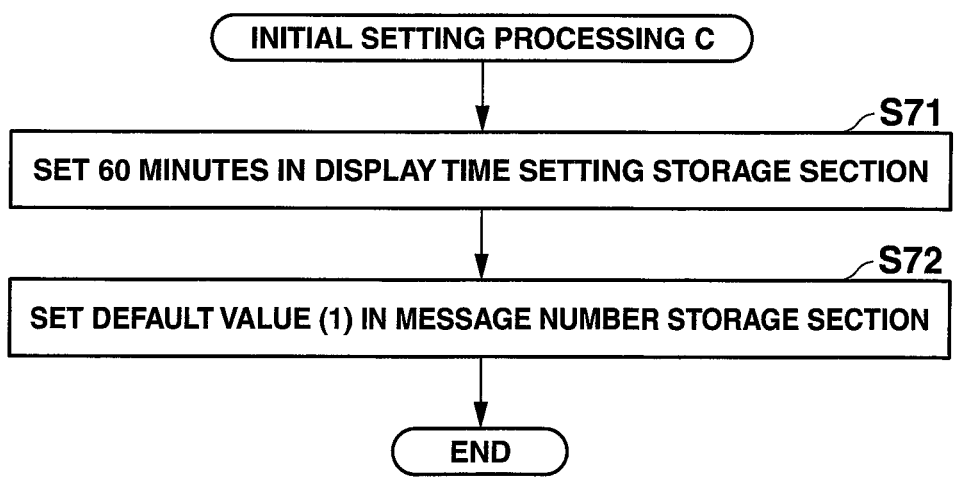
FIG. 11 is a diagram illustrating an example of a message table.
FIG. 12 is a flowchart showing initial setting processing C which is executed by a communication device in the third embodiment.

FIG. 11 shows an example of the message table 151. As shown in FIG. 11, message numbers and texts of call request message are stored in the message table 151 so as to be associated with each other.

The storage section 15 is also provided with the display time setting storage section and a message number storage section which is not shown in the drawings.

The other configurations of the communication system 300 are the same as those described in the second embodiment, and thus the explanation thereof is omitted.

Next, operations of the communication system 300 in the third embodiment will be described.

The call operation in the communication system 300 is the same as that of the first embodiment, and thus the explanation thereof is omitted. Hereinafter, the call request notification operation will be described.

As a precondition of the call request notification operation, at each of the telephones 1A and 1B, initial setting processing C shown in FIG. 12 is executed in cooperation between the CPU 11 and the processing program 15c when the power is turned on.

As shown in FIG. 12, in the initial setting processing C, first, a default display time (here, 60 minutes) for displaying the call request notification on the other telephone is stored as the display time setting information in the display time setting storage section of the storage section 15 (step S71).

Then, as a default value of a message number indicating the call request message, the message number 1 of the message table 151 is stored in the message number storage section of the storage section 15 (step S72).

(Processing on the Transmitting Side)

At the telephone 1A or 1B in the third embodiment, the user on the transmitting side can set the display time of the call request notification on the recipient's telephone by pushing the time setting button 13c. Further, after inputting the recipient's phone number via the dial button group 13a, the user pushes the message button 13d to set the type of call request message to be displayed on the recipient's telephone and pushes the call request button 13b so that the user can display the call request notification including a desired call request message on the recipient's telephone only for the desired period of time.

When the recipient's phone number is input through the dial button group 13a, as shown in the telephone 1A of FIG. 10, the input phone number is displayed in the lower part of the display panel 14a. In the upper part of the display panel 14a, the display time setting information is displayed so that the display time of the call request notification can be confirmed.

Hereinafter, each processing which is executed in cooperation between the CPU 11 and the processing program 15c when the above buttons are operated at the telephone 1A or 1B will be described.

Since the time setting button processing which is executed each time the time setting button 13c is pushed is the same as that described with FIG. 7 in the second embodiment, the explanation thereof is omitted.

Figure 13:
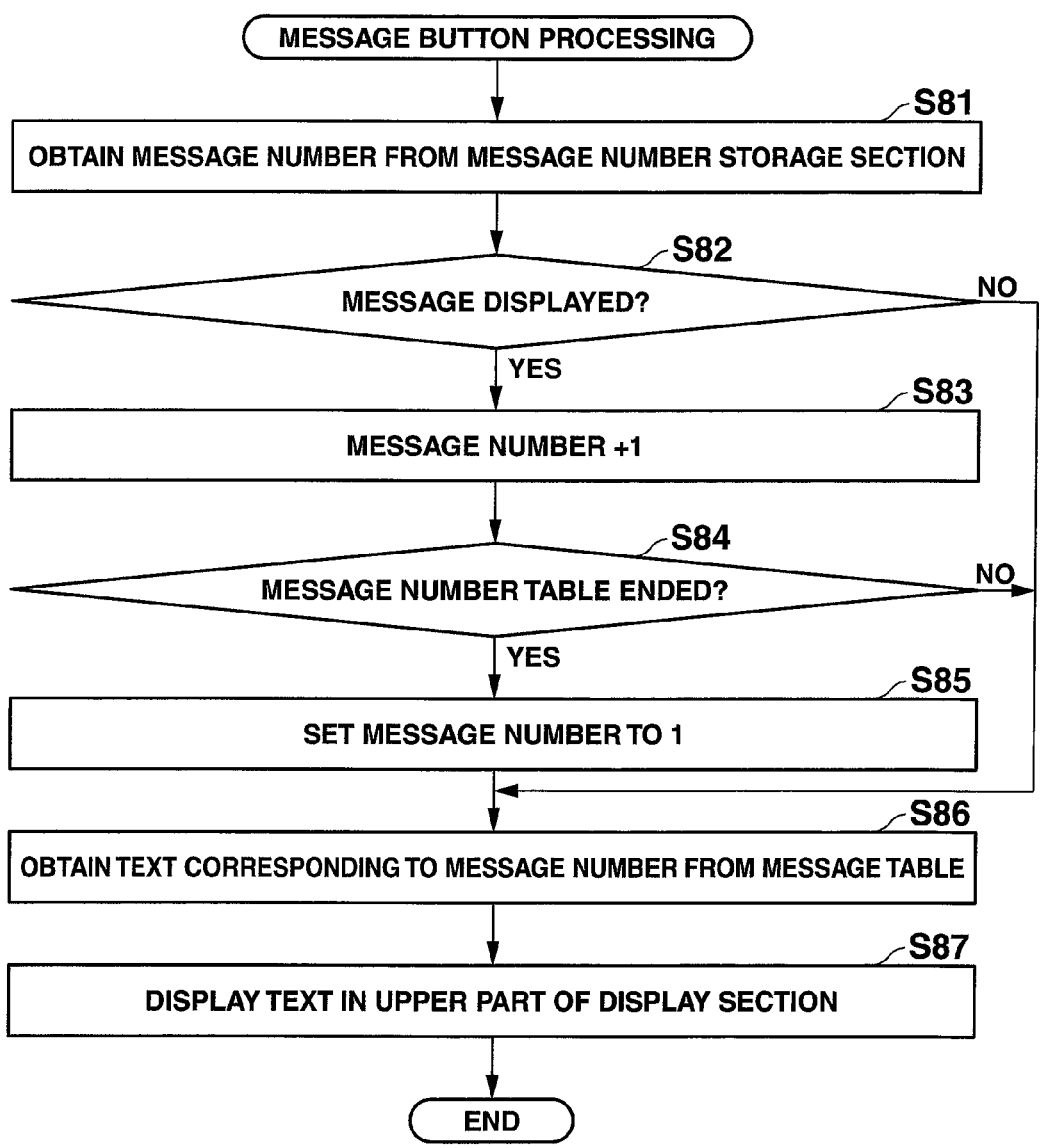
FIG. 13 is a flowchart showing message button processing which is executed by a transmitting communication device in the third embodiment.

FIG. 13 is a flowchart showing operations of the message button processing which is executed by the CPU 11 each time the message button 13d is pushed at the telephone 1A or 1B.

First, the message number is obtained from the message number storage section of the storage section 15 (step S81).

Then, whether the call request message is displayed on the display panel 14a of the display section 14 is determined (step S82).

If the call request message is not determined to be displayed on the display panel 14a (step S82; NO), a text corresponding to the message number in the message number storage section is obtained from the message table 151 stored in the storage section 15 (step S86). Then, the obtained text is displayed in the upper part of the display panel 14a (step S87), and the message button processing ends.

On the other hand, if the call request message is determined to be displayed on the display panel 14a (step S82; YES), 1 is added to the message number in the message number storage section (step S83).

Then, whether the message number after the addition is the number of the last record in the message table 151 is determined. If the message number is not determined to be the number of the last record (step S84; NO), the text corresponding to the message number is obtained from the message table 151 (step S86). Then, the obtained text is displayed in the upper part of the display panel 14a (step S87), and the message button processing ends.

On the other hand, if the message number is determined to be the number of the last record (step S84; YES), the message number 1 is set in the message number storage section (step S85). Then, the text corresponding to the message number is obtained from the message table 151 (step S86), the obtained text is displayed in the upper part of the display panel 14a (step S87) and the message button processing ends.

Figure 14:
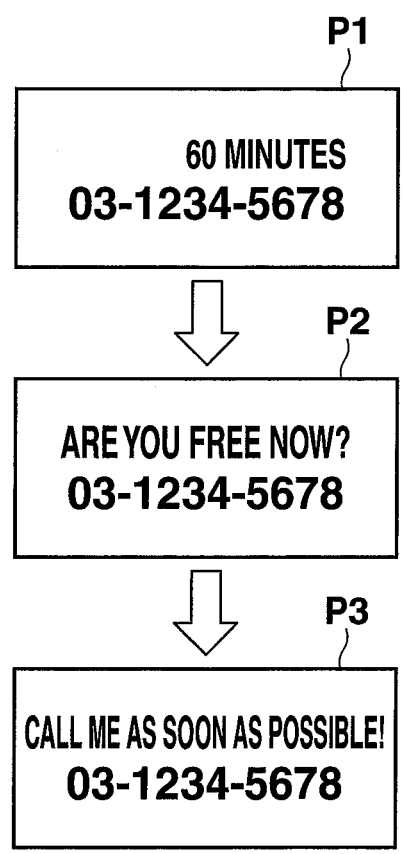
FIG. 14 is a diagram illustrating display transition of a display panel when a message button is pressed.

FIG. 14 shows an example of display shift of the display panel 14a when the message button 13d is pushed. As shown in P1 of FIG. 14, in a case where the call request message is not displayed in the upper part of the display panel 14a when the message button 13d is to be pushed, when the message button 13d is pushed, the call request message of "Are you free now?" corresponding to the default message number 1 is displayed as shown in P2 of FIG. 14. When the message button 13d is pushed again, the call request message of "Call me as soon as possible!" corresponding to the message number 2 which is obtained by adding 1 to the message number 1 is displayed as shown in P3 of FIG. 14.

In such way, each time the message button 13d is pushed, 1 is added to the message number in the message number storage section, the text of the corresponding call request message stored in the message table 151 is displayed and the message number of the displayed message can be set as the call request message to be displayed on the receiving side in the message number storage section.

Next, the processing when the call request button 13b is pushed will be described.

Figure 15:
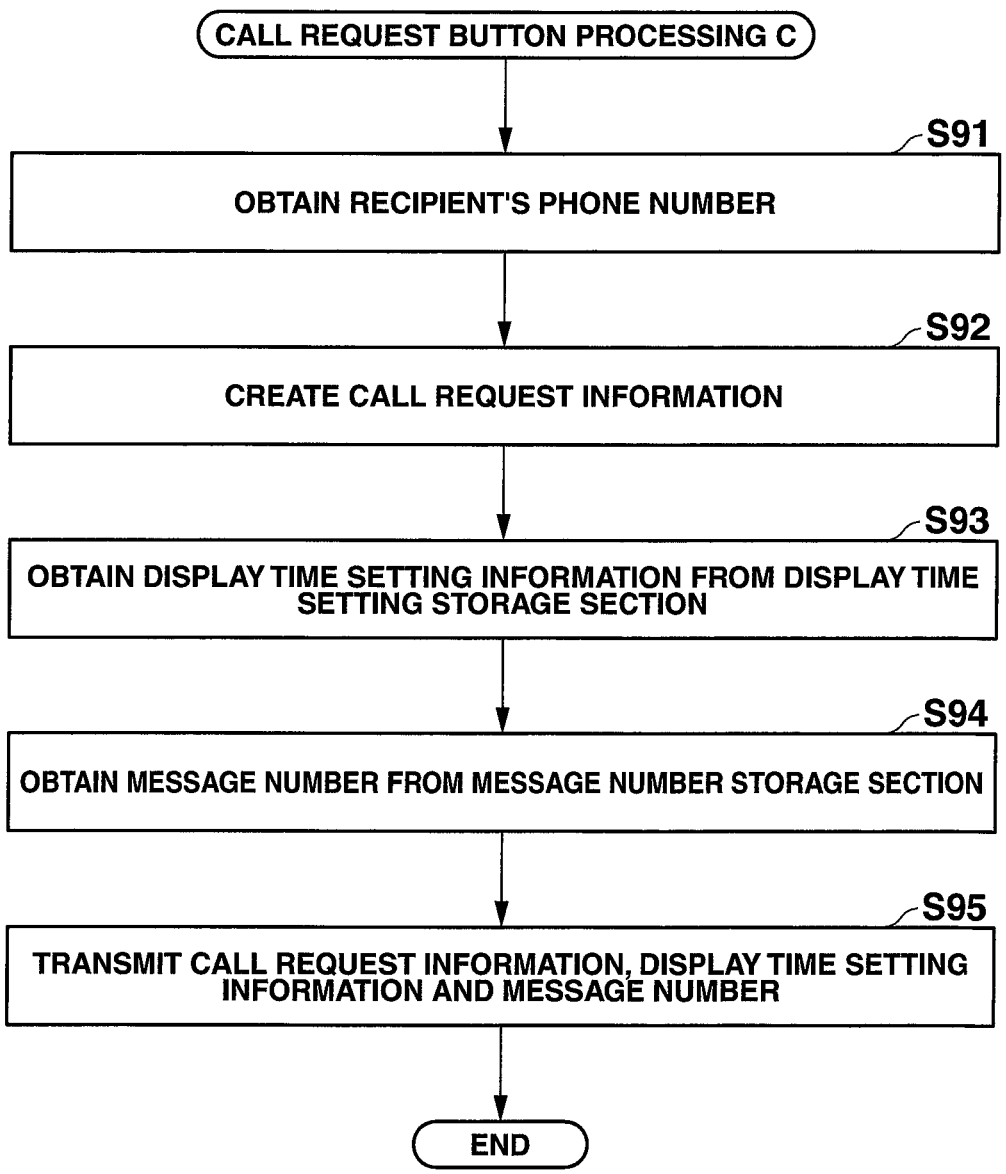
FIG. 15 is a flowchart showing call request button processing C which is executed by the transmitting communication device in the third embodiment.

FIG. 15 is a flowchart showing operations of the call request button processing C which is executed by the CPU 11 each time the call request button 13b is pushed.

In the call request button processing C, first, the recipient's phone number displayed on the display panel 14a is obtained (step S91).

Then, the call request information for displaying the call request notification on the recipient's telephone for the predetermined time period is created (step S92).

Then, the display time setting information is obtained from the display time setting storage section of the storage section 15 (step S93).

The message number is obtained from the message number storage section of the storage section 15 (step S94).

Then, the call request information, the display time setting information and the message number are transmitted to the recipient's phone number via the communication network N by the communication control section 17 (step S95).

In step S95, specifically, the recipient's phone number, the call request information, the display time setting information and the message number are transmitted as a signal to the line of the communication network N by the communication control section 17. When the signal reaches the circuit switch, the circuit switch identifies the source phone number of the signal, creates a signal by adding the display time setting information and the source phone number to the call request information, and transmits the signal to the recipient's phone number.

(Processing on the Receiving Side)

Next, processing which is executed when the call request information is received at the telephone 1A or 1B will be described.

Figure 16:
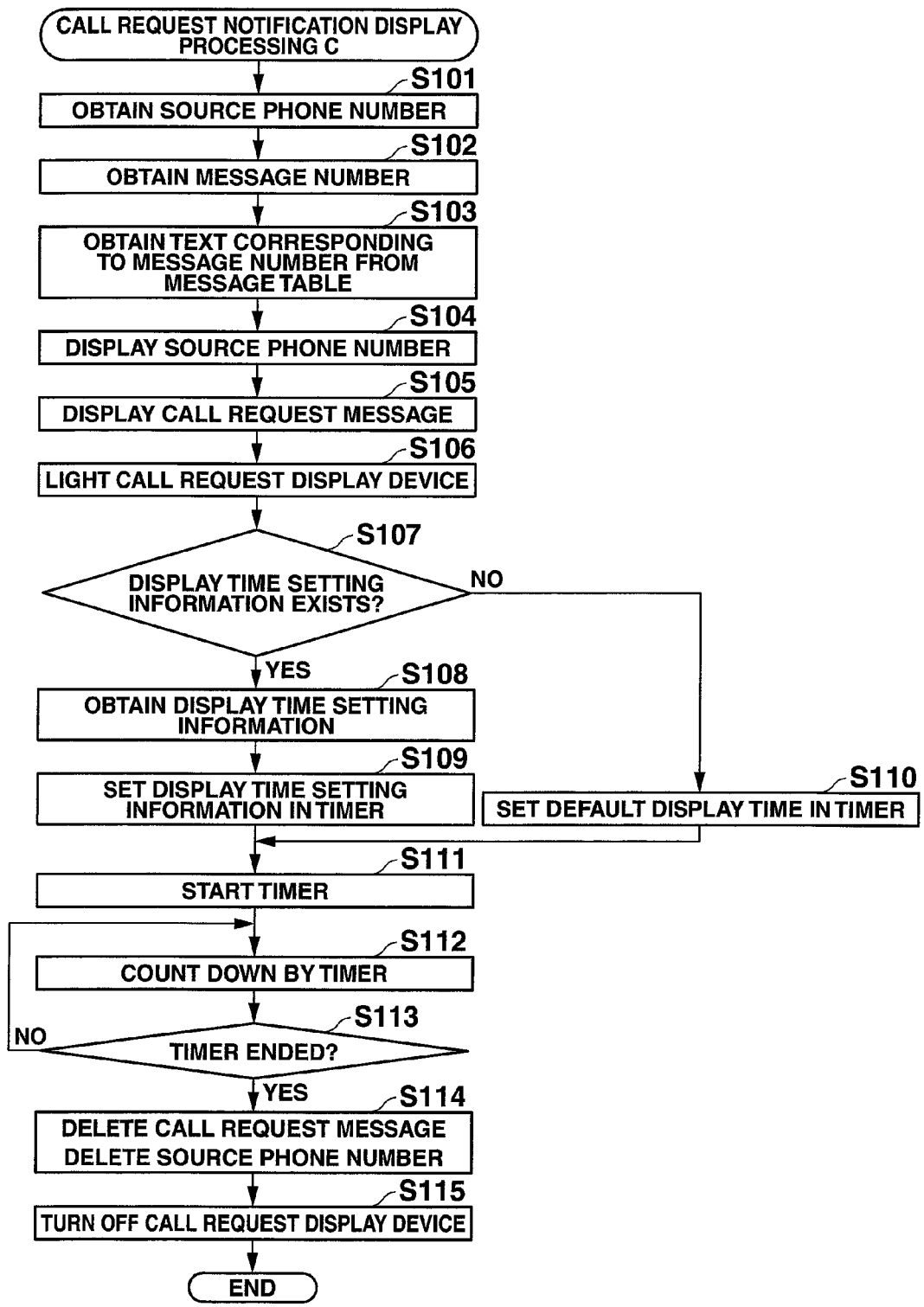
FIG. 16 is a flowchart showing call request notification display processing C which is executed by a receiving communication device in the third embodiment.

FIG. 16 is a flowchart showing operations of the call request notification display processing C which is executed by the CPU 11 when the call request information is received by the communication control section 17 at the telephone 1A or 1B.

First, the source phone number which is added to the received call request information is obtained (step S101).

Then, the message number which is added to the received call request information is obtained (step S102), and the text corresponding to the message number is obtained from the message table 151 of the storage section 15 (step S103).

The source phone number obtained in step S101 is displayed on the display panel 14a of the display section 14 (step S104). The text of the call request message obtained in step S103 is displayed on the display panel 14a (step S105). Further, the call request display device 14b is lighted (step S106).

FIG. 10 shows the telephone 1B in a state where the source phone number and the call request message are displayed on the display panel 14a in steps S104 and 105 and the call request display device 14b is lighted in step S106.

Next, whether the display time setting information is added to the call request notification information is determined (step S107). If it is determined that the display time setting information is added to the call request notification information (step S107; YES), the display time setting information is obtained (step S108). The display time setting information is set to the timer 18 as the display time (step S109), and the processing shifts to step S111.

On the other hand, if it is not determined that the display time setting information is added to the call request notification information (step S107; NO), the default display time is set to the timer 18 as the display time (step S110), and the processing shifts to step S111.

The timer 18 starts time measurement (step S111), and countdown is performed at regular intervals (step S112). When the set display time has elapsed and the notification signal notifying the end of the time counting operation is output from the timer 18 (step S113; YES), the call request message and the source phone number are deleted from the display panel 14a (step S114). Also, the light of the call request display device 14b is turned off (step S115), and the call request notification display processing C ends.

As described above, according to the third embodiment, at the telephone 1A or 1B on the transmitting side as the first communication device, when the call request button 13b is pushed after selecting the call request message by the message button 13d, the CPU 11 adds the message number of the selected message to the call request information and transmits the information to the receiving telephone as the second communication device by the communication control section 17. At the receiving telephone, when the message number in addition to the call request information are received by the communication control section 17, the CPU 11 displays the call request message corresponding to the message number on the display panel 14a.

Accordingly, the call request message to be displayed on the receiving telephone can be different messages such as "Are you free now?" and "Call me as soon as possible" according to the situation of the sender, for example. The situation of the caller (sender) can be communicated to the recipient, and thus the convenience is more improved.

Though the above third embodiment describes an example where the message button 13d is provided to the telephones 1A and 1B of the second embodiment, the message button 13d may be provided to the telephones 1A and 1B of the first embodiment (that is, the telephones which do not have the time setting button). Then, the call request message may be set at the telephone on the transmitting side and the message number in addition to the call request information may be transmitted to the recipient's telephone so that the desired call request message can be displayed on the recipient's telephone.

Fourth Embodiment

Next, the fourth embodiment will be described.

In the first to third embodiments, the call request message displayed on the recipient's telephone continues to be displayed for a fixed period of time or a set period of time, and automatically disappears when the display time has elapsed. Thus, the sender cannot stop the display. The sender of the call request message is not available due to sudden outing or visitors after transmitting the call request message. Thus, the fourth embodiment enables cancel of the display of the transmitted call request message by the telephone on the transmitting side.

Figure 17:
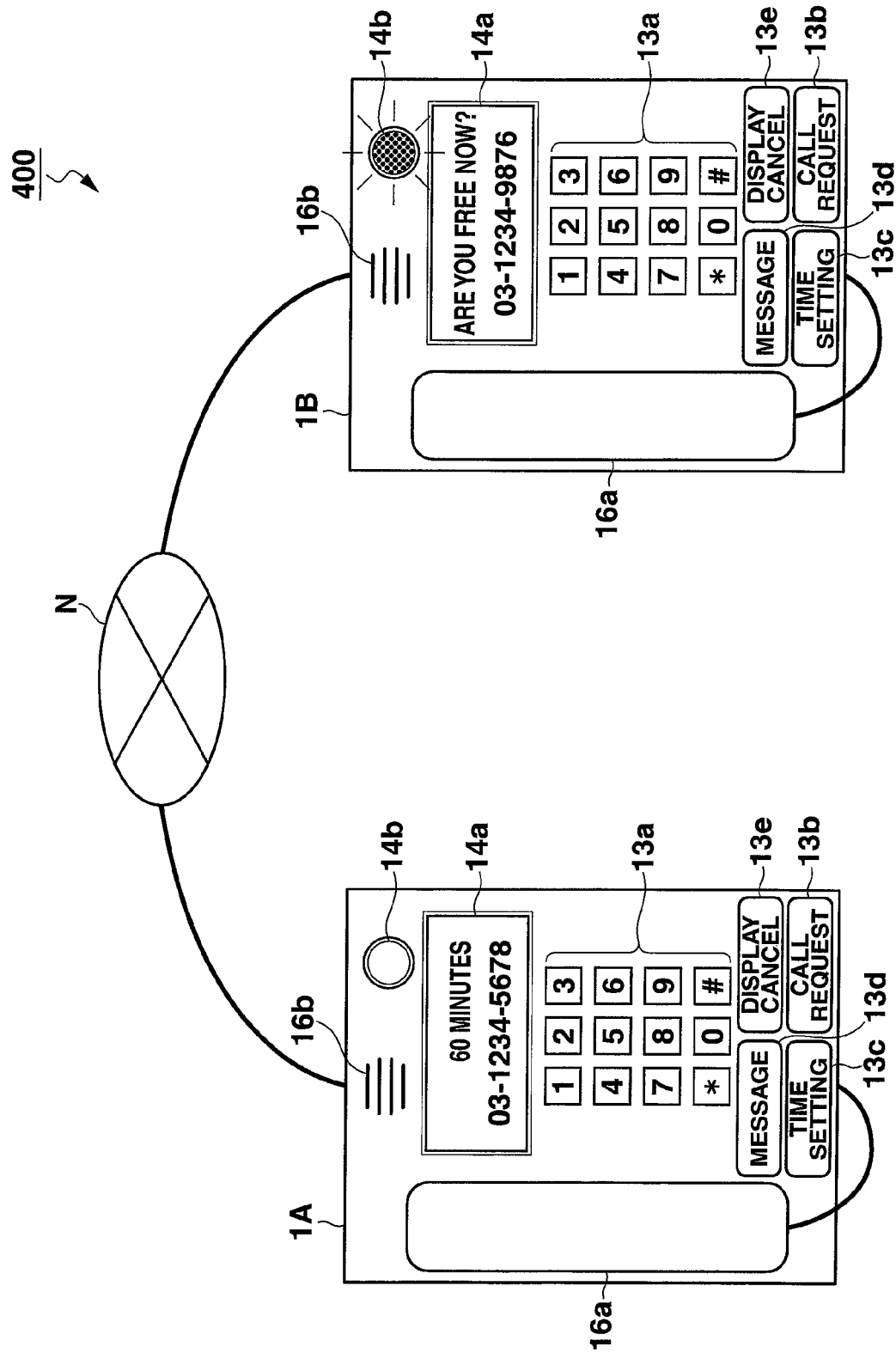
FIG. 17 is a diagram illustrating an entire configuration example of a communication system in a fourth embodiment.

FIG. 17 is a diagram illustrating an entire configuration of a communication system 400 in the fourth embodiment.

As shown in FIG. 17, in the communication system 400, the operation section 13 of each of the telephones 1A and 1B is provided with a display cancel button 13e as a cancel instructing section.

In the program storage section 150 of the storage section 15, a processing program 15d (not shown in the drawings) is stored in addition to the system program. The CPU 11, in cooperation with the processing program 15d, executes the call operation and each processing (see FIGS. 7, 12, 13, 16 and 19-21) according to the call request notification operation, and functions as a control section, a call request transmitting section and a cancel information transmitting section.

In the storage section 15, the message table 151 shown in FIG. 11 is stored.

The storage section 15 is provided with a message transmission history storage section 152 in addition to the display time setting storage section and the message number storage section.

FIG. 18 shows an example of the message transmission history storage section 152. As shown in FIG. 18, the message transmission history storage section 152 is provided with "sent time" area, "message number" area, "recipient's phone number" area and "display end time" area, and the transmission history information including the items can be stored in the message transmission history storage section 152.

The other configurations of the communication system 400 are the same as those described in the third embodiment, and thus the explanation thereof is omitted.

Next, the operation of the communication system 400 in the fourth embodiment will be described.

The call operation in the communication system 400 is the same as that described in the first embodiment, and thus the explanation thereof is omitted.

The initial setting processing and the message button processing in the processing on the transmitting side of the call request notification operation are respectively the same as the initial setting processing C (see FIG. 12) and the message button processing (see FIG. 13) described in the third embodiment. The time setting button processing is the same as the time setting button processing (see FIG. 7) described in the second embodiment and thus the explanation thereof is omitted. The call request button processing will be described.

Figure 19:
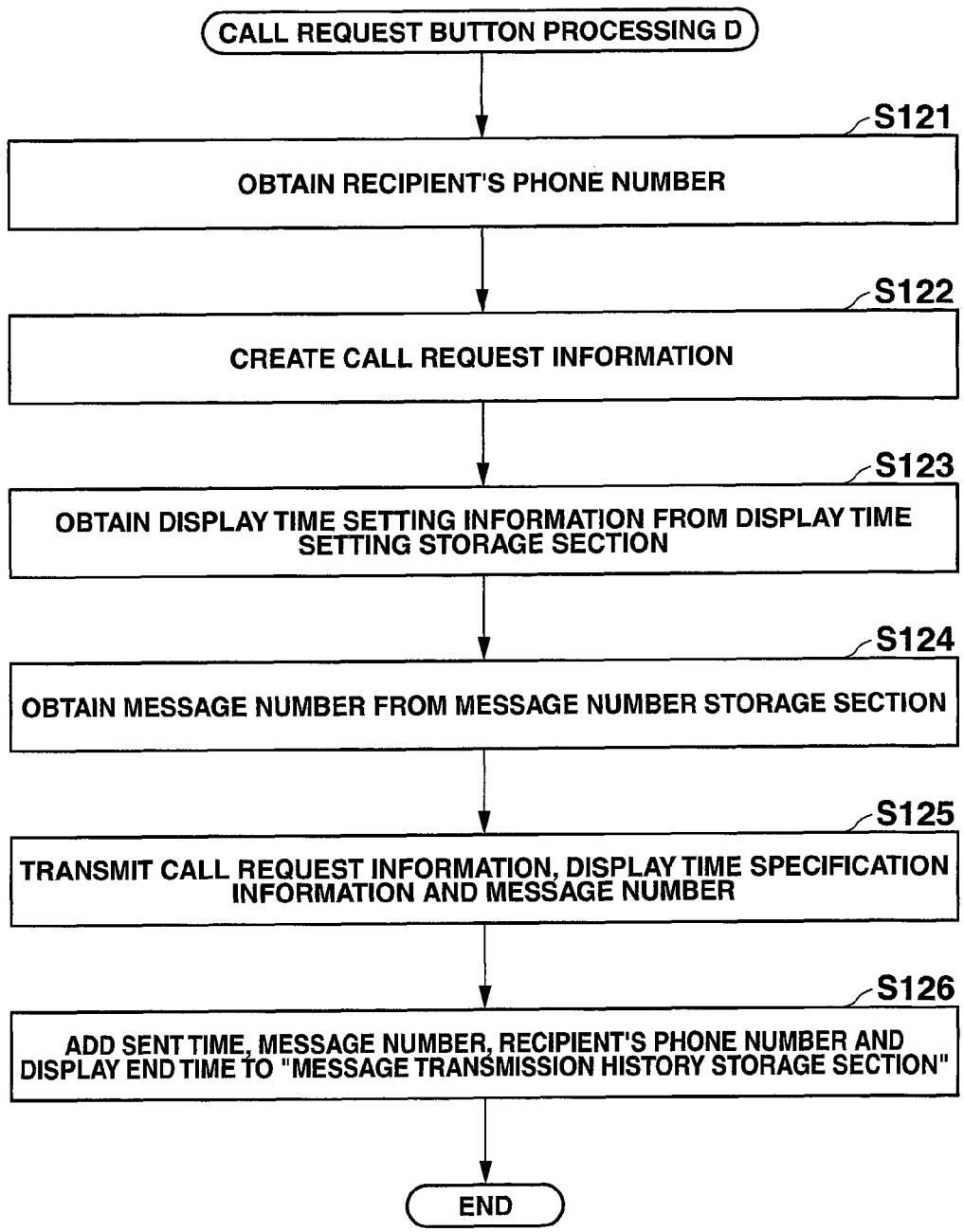
FIG. 19 is a flowchart showing call request button processing D which is executed by a transmitting communication device in the fourth embodiment.

FIG. 19 is a flowchart showing call request button processing D which is executed in cooperation between the CPU 11 and the processing program 15d when the call request button 13b is pushed at the telephone 1A or 1B.

In the call request button processing D, as shown in FIG. 19, processing from step S121 to step S125 is executed at first. Thus, the call request information, the display time setting information and the message number are transmitted to the recipient's phone number. The processing of steps S121 to S125 is the same as the processing of steps S91 to S95 shown in FIG. 15, and thus the explanation thereof is omitted.

In step S126, the sent time, the message number, the recipient's phone number and the display end time of the call request information are stored in the message transmission history storage section 152 of the storage section 15 (step S126), and the call request button processing D ends.

Though not shown in the drawings, a time measurement section for measuring current time is provided to the telephones 1A and 1B. As the sent time, the time when the call request information and such like are sent in step S125 is stored. As the display end time, the time obtained by adding the display time of the display time setting information to the sent time is stored.

At the telephone 1A or 1B, when receiving the call request information, the same processing as the call request notification display processing C shown in FIG. 16 is executed. The call request notification display processing C is the same as that described in the third embodiment, and thus the explanation thereof is omitted.

Next, the call request message display cancel operation will be described.

First, display cancel button processing which is executed when a display cancel button 13e is pushed at the telephone 1A or 1B on the transmitting side of the call request information will be described.

Figure 20:
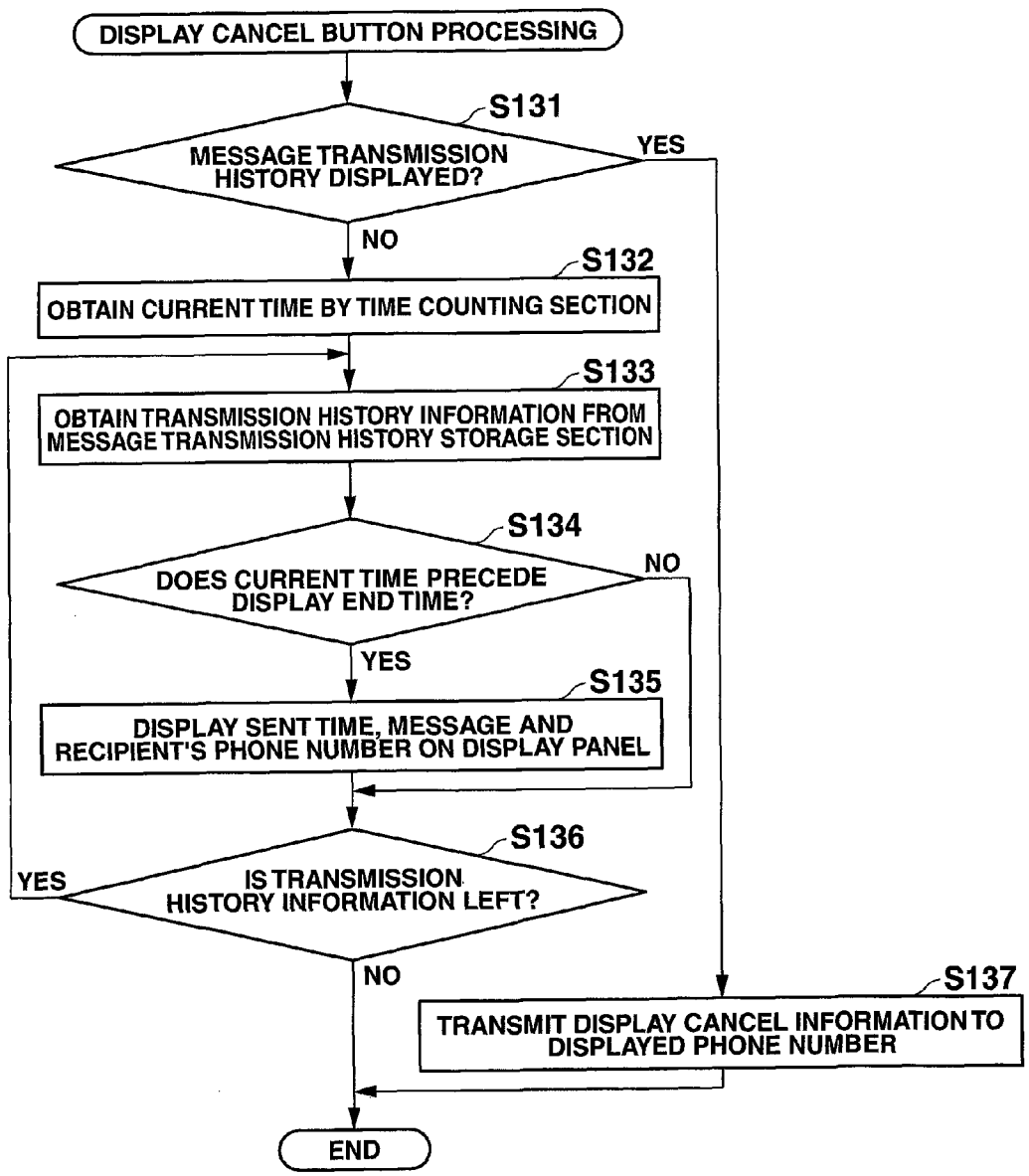
FIG. 20 is a flowchart showing display cancel button processing which is executed by the transmitting communication device in the fourth embodiment.

FIG. 20 is a flowchart showing operations of the display cancel button processing which is executed by the CPU 11 and the processing program 15d when the display cancel button 13e is pushed.

In the display cancel button processing, first, whether the message transmission history is displayed on the display panel 14a of the display section 14 is determined (step S131).

If the message transmission history is not determined to be displayed on the display panel 14a (step S131; NO), the current time is obtained by the time measurement section (step S132). A set of the transmission history information stored in the message transmission history storage section 152 of the storage section 15 is obtained (step S133). Then, whether the current time precedes the display end time is determined (step S134).

If the current time is determined to precede the display end time (step S134; YES), the sent time, the call request message and the recipient's phone number of the transmission history information are displayed on the display panel 14a (step S135), and the processing shifts to step S136.

On the other hand, if the current time is not determined to precede the display end time (step S134; NO), the processing shifts to step S136.

In step S136, whether there is another set of transmission history information which is not obtained yet in the message transmission history storage section 152 is determined. If it is determined that there is another set of transmission history information which is not obtained yet from the message transmission history storage section 152 (step S136; YES), the processing returns to step S133. The processing of steps S133 to S136 is repeatedly executed. If it is determined that all sets of the transmission history information stored in the message transmission history storage section 152 are obtained (step S136; NO), the display cancel button processing ends.

On the other hand, in step S131, if it is determined that the message transmission history is displayed on the display panel 14a (step S131; YES), the communication control section 17 transmits display cancel information instructing cancel of the call request notification to all the phone numbers displayed on the display panel 14a (step S137), and the display cancel button processing ends. Specifically, the recipient's phone number and the display cancel information are transmitted as a signal to the line of the communication network N by the communication control section 17. When the signal reaches the circuit switch, the source phone number is identified and added to the display cancel information, and the information is transmitted to the recipient's phone number by the circuit switch.

That is, when the display cancel button 13e is pushed once, the transmission history information is displayed on the display panel 14a. When the display cancel button 13e is pushed thereafter, the display cancel information is transmitted to the telephone on which the call request notification is displayed.

Next, processing which is executed when the display cancel information is received at the telephone 1A or 1B will be described.

Figure 21:
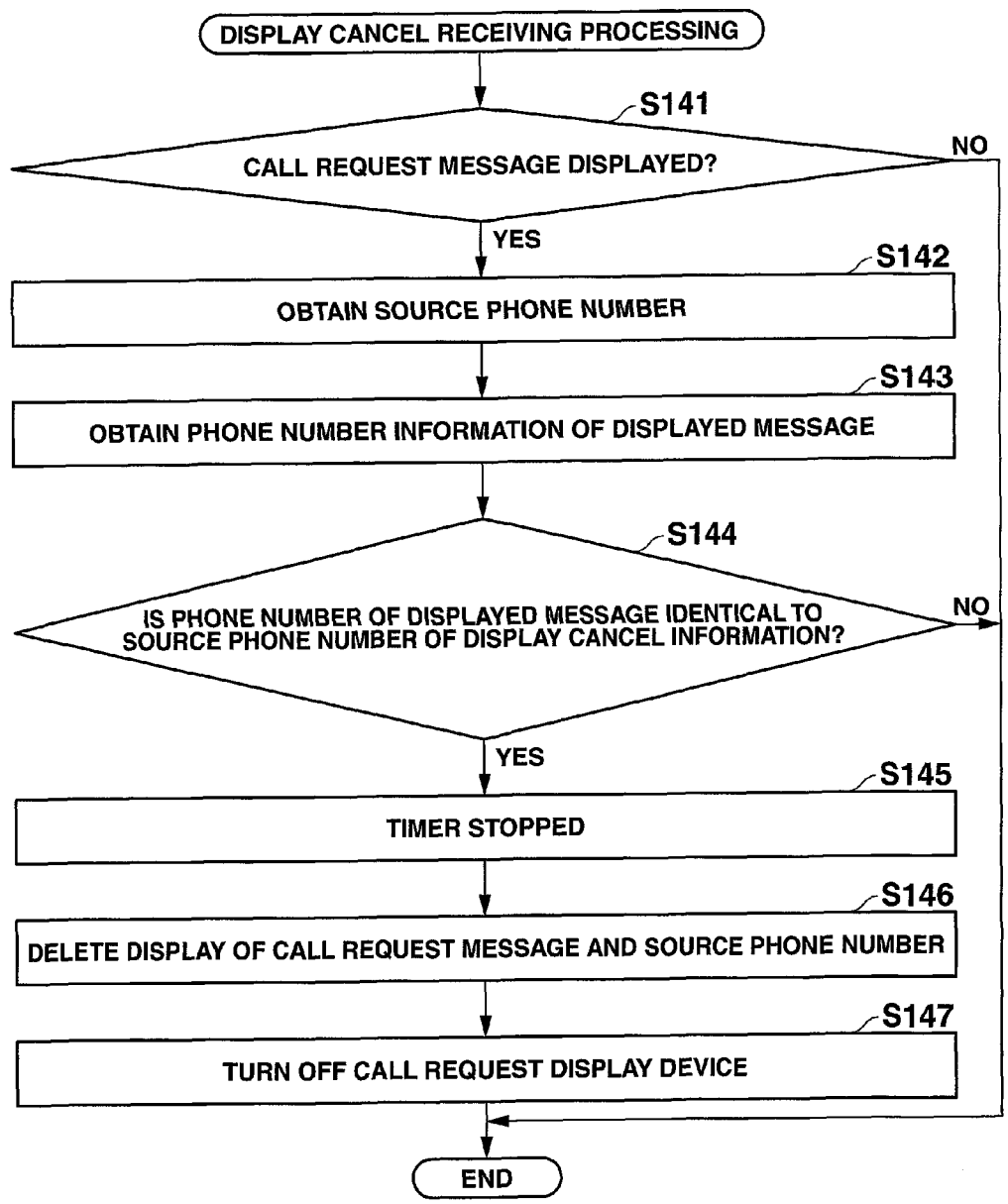
FIG. 21 is a flowchart showing display cancel receiving processing which is executed by a receiving communication device in the fourth embodiment.

FIG. 21 is a flowchart showing operations of the display cancel receiving processing which is executed by the CPU 11 when the display cancel information is received by the communication control section 17 at the telephone 1A or 1B.

First, whether the call request message is displayed on the display panel 14a of the display section 14 is determined (step S141).

If it is not determined that the call request message is displayed on the display panel 14a (step S141; NO), the display cancel receiving processing ends.

On the other hand, if it is determined that the call request message is displayed on the display panel 14a (step S141; YES), the source phone number added to the display cancel information is obtained (step S142). Then, the source phone number displayed on the display panel 14a with the call request message is obtained (step S143).

Whether the source phone number added to the display cancel information is identical to the displayed source phone number is determined (step S144).

If the source phone number added to the display cancel information is not determined to be identical to the displayed source phone number (step S144; NO), the display cancel receiving processing ends.

On the other hand, if the source phone number added to the display cancel information is determined to be identical to the displayed source phone number (step S144; YES), the timer 18 is stopped (step S145). The call request message and the source phone number displayed on the display panel 14a are deleted (step S146). The light of the call request display device 14b is turned off (step S147), and the display cancel receiving processing ends.

As described above, according to the fourth embodiment, at the telephone 1A or 1B on the transmitting side as the first communication device, when the display cancel button 13e is pushed, the CPU 11 detects, in the message transmission history storage section 152, the recipient's phone number for which the display end time has not arrived, and displays the phone number on the display panel 14a. When the display cancel button 13e is pushed again, the CPU 11 transmits the display cancel information to the displayed recipient's phone number by the communication control section 17. At the telephone on the receiving side as the second communication device, when the display cancel information is received by the communication control section 17, the CPU 11 determines whether the source phone number included in the display cancel information is identical to the source phone number of the call request message which is currently displayed. If the source phone number included in the display cancel information is identical to the currently displayed source phone number, the CPU 11 stops the timer 18 and stops the output of the call request notification. That is, the CPU 11 deletes the call request message and the source phone number from the display panel 14a and turns off the light of the call request display device 14b.

Accordingly, when the sender wants to cancel the call request notification due to sudden outing, visitors and such like after transmitting the call request information, the sender can stop the output of the call request notification displayed on the recipient's telephone by the sender's telephone, and thus the convenience is improved.

Though the fourth embodiment describes an example where each of the telephones 1A and 1B of the third embodiment is provided with the display cancel button 13e, the display cancel button 13e may be provided to the telephones 1A and 1B of the first or second embodiment. Then, the sender's telephone stores the transmission history information of the call request information in the storage section 15. When the display cancel button 13e is pushed, the display cancel information may be transmitted to another recipient's phone number in the transmission history information by performing the same processing as the display cancel button processing shown in FIG. 20. At the telephone receiving the display cancel information, the display cancel receiving processing shown in FIG. 21 is carried out to stop the call request notification.

Fifth Embodiment

Next, the fifth embodiment will be described.

In the first to fourth embodiments, only one telephone can be specified as the receiver. In the fifth embodiment, the call request message can be transmitted to a plurality of receivers.

Figure 22:
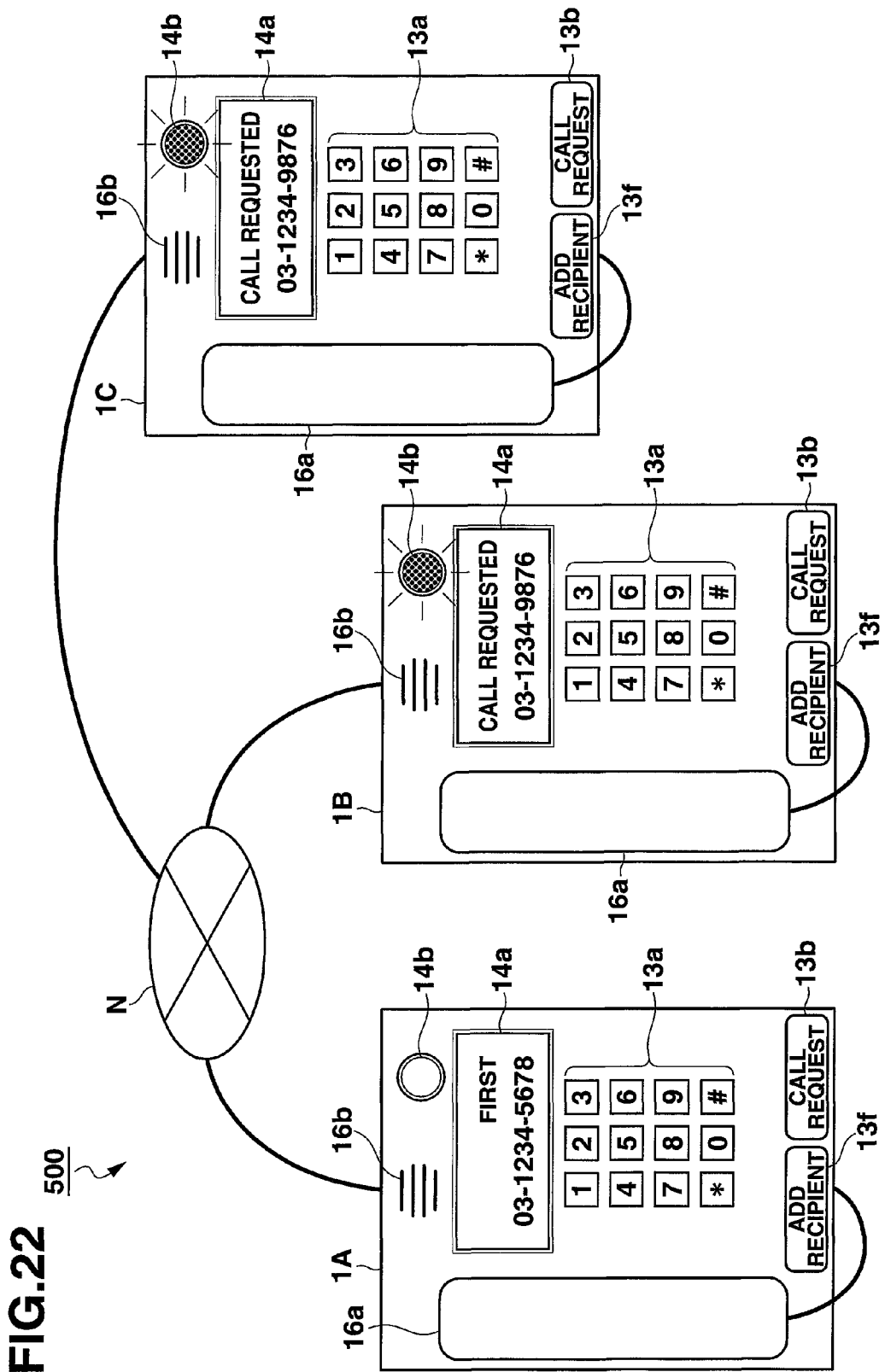
FIG. 22 is a diagram illustrating an entire configuration example of a communication system in a fifth embodiment.

FIG. 22 is a diagram illustrating an entire configuration of a communication system 500 in the fifth embodiment.

As shown in FIG. 22, the communication system 500 is configured so that at least three telephones including the telephones 1A, 1B and 1C can be connected to each other via the communication network N.

In the communication system 500, the operation section 13 of each of the telephones 1A, 1B, 1C and so on is provided with a recipient add button 13f.

Also, in the storage section 15, a processing program 15e is stored in addition to the system program. The CPU 11, in cooperation with the processing program 15e, executes each processing according to the call operation and an after-mentioned call request notification operation (see FIGS. 24 to 25).

Figure 23:
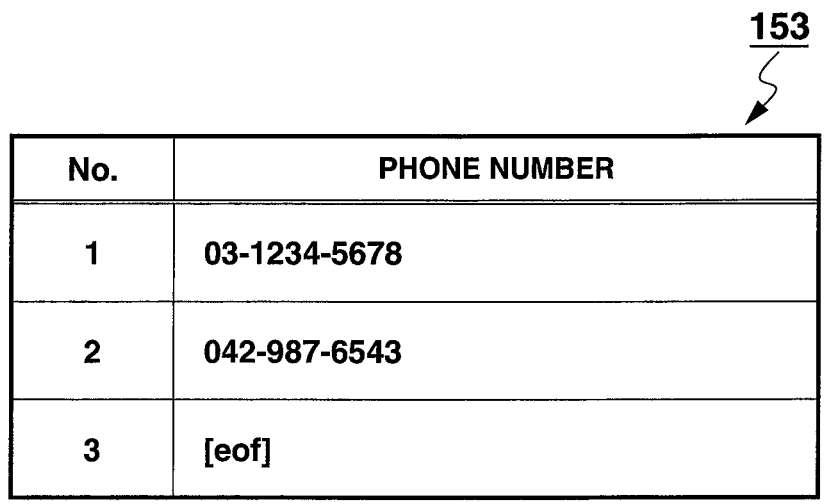
FIG. 23 is a diagram illustrating a data storage example of a phone number information list storage section.

The storage section 15 also includes a phone number information list storage section 153 for storing a plurality of phone numbers to transmit the call request information as shown in FIG. 23.

The other configurations of the communication system 500 and the telephones 1A, 1B, 1C and so on included therein are the same as those of the communication system 100 and the telephones 1A and 1B described in the first embodiment, and thus the explanation thereof is omitted.

Next, the operation of the communication system 500 in the fifth embodiment will be described.

The processing of the call operation in the communication system 500 is the same as that of the first embodiment, and thus the explanation thereof is omitted. Hereinafter, the call request notification operation will be described.

In the fifth embodiment, the sender can transmit the call request notification to telephones of a plurality of receivers by a single operation of the call request button 13b. Hereinafter, each processing for transmitting the call request notification to a plurality of receivers will be described.

Figure 24:
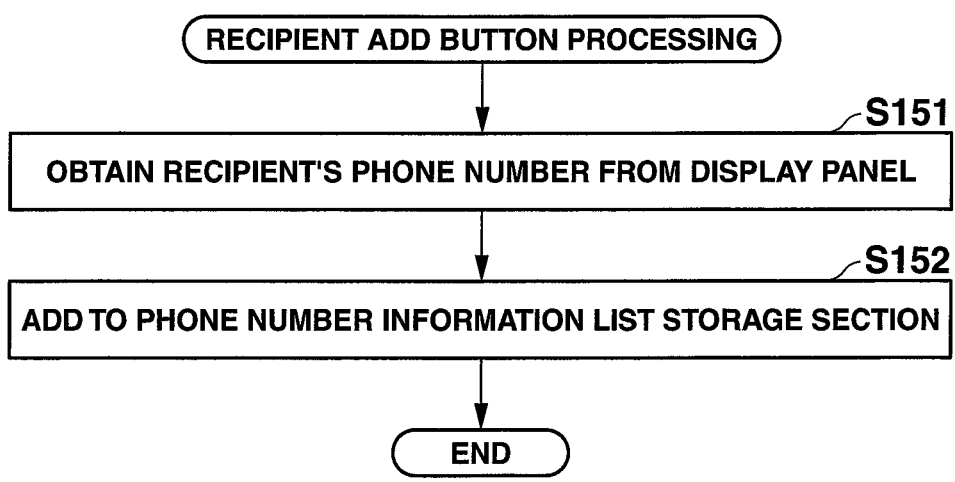
FIG. 24 is a flowchart showing recipient add button processing which is executed by a transmitting communication device in the fifth embodiment.

FIG. 24 is a flowchart showing operations of the recipient add button processing which is executed by the CPU 11 each time the recipient's phone number is input by the dial button group 13a and the recipient add button 13f is pushed at any of the telephones 1A, 1B and 1C.

The recipient's phone number input by the dial button group 13a is displayed on the display panel 14a.

First, the phone number displayed on the display panel 14a is obtained (step S151).

Then, the obtained phone number is added to the phone number information list storage section 153 (step S152), and the recipient add button processing ends. The phone number added to the phone number information list storage section 153 is deleted from the display panel 14a so that the next phone number can be input.

FIG. 25 is a flowchart showing call request button processing E which is executed when the call request button 13b is pushed at any of the telephones 1A to 1C.

First, the phone number displayed on the display panel 14a is obtained (step S161). The obtained phone number is added to the phone number information list storage section 153 (step S162).

Then, the phone number information list stored in the phone number information list storage section 153 is obtained (step S163). Whether the obtained phone number information list includes a phone number which is not transmitted yet is determined (step S164).

When the phone number information list is not determined to include an unsent phone number (step S164; NO), the call request button processing E ends.

When the phone number information list is determined to include an unsent phone number (step S164; YES), the phone number is obtained as the recipient's phone number (step S165). The call request information for displaying the call request notification on the recipient's telephone for a predetermined period of time is created (step S166). Then, the call request information is transmitted to the recipient's phone number via the communication network N by the communication control section 17 (step S167).

In step S167, specifically, the recipient's phone number and the call request information are transmitted as a signal to the line of the communication network N by the communication control section 17. When the signal reaches the circuit switch, the source phone number is identified and added to the call request information, and the information is transmitted to the recipient's phone number by the circuit switch. After the transmission, the recipient's phone number is deleted from the phone number information list storage section 153.

After transmitting the call request information, the processing returns to step S164. The processing of steps S164 to 167 is repeatedly executed until the call request information is transmitted to all the phone numbers in the phone number information list (until there is no unsent phone number). When it is determined that the transmission of the call request information to all the phone numbers in the phone number information list is completed and there is no unsent phone number (step S164; NO), the call request button processing E ends.

As described above, by adding the recipient's phone number of the call request information with the recipient add button 13f, the call request information can be transmitted to a plurality of recipient's phone numbers at once.

The operation of each of the telephones receiving the call request information is the same as the call request notification display processing of FIG. 4, and thus the explanation thereof is omitted.

When there is a call from any of the plurality of the telephones to which the call request information was transmitted, the call request notification to the other telephones may be stopped by transmitting the cancel information of instructing the cancel of the call request notification to the other receiving telephones to which the call request information was transmitted.

For example, after transmitting the call request information in the call request button processing D, the CPU 11 stores the transmission history information such as the sent time, the recipient's phone number and the display end time in the storage section 15.

When there is a call from any of the recipient's phone numbers in the transmission history information stored in the storage section 15, the display cancel information may be transmitted to the other phone numbers in the transmission history information by performing the display cancel button processing shown in FIG. 20. At the telephone receiving the display cancel information, the display cancel receiving processing shown in FIG. 21 is executed and the output of the call request notification is stopped.

In such way, it is possible to avoid an inconvenient case where the sender becomes busy talking on the phone after transmitting the call request information to a plurality of recipients and cannot respond to the calls from the other recipients, for example.

The fifth embodiment describes an example where the telephones 1A and 1B in the first embodiment are provided with the recipient add button 13f. However, the recipient add button 13f may be provided to the telephones 1A, 1B (and 1C) of the second to fourth embodiments so as to input a plurality of recipient's phone numbers and transmit the call request information to each of the plurality of receiving telephones whose numbers are input.

Though the first to fifth embodiments are described above, the embodiments are preferred examples of the communication system according to the present invention and thus the present invention is not limited to this.

For example, though the call request notification such as the call request message is displayed on the display panel 14a or via the call request display device 14b as an output means in the above embodiments, the call request notification may be output by sound or such like.

Further, in the above embodiments, the recipient's phone number is specified by inputting the recipient's phone number via the dial button group 13a. However, an address book may be registered in the storage section 15 to specify (select) the recipient's phone number in the address book.

Though the display time period (output time period) of the call request notification is set and displayed by the minute in the above embodiments, the present invention is not limited to this. For example, the display time may be set and displayed by the day such as one day or two days.

Changes can also be made within the scope of the present invention with respect to the other detailed configurations and operations of the devices included in the communication system.

The entire disclosure of Japanese Patent Application No. 2012-161710 filed on Jul. 20, 2012 including description, claims, drawings, and abstract are incorporated herein by reference in its entirety.

What is claimed is:

1. A communication device, comprising:
a receiver specification section which specifies a receiving communication device; and
a control section which transmits, to the receiving communication device specified by the receiver specification section, call request information which controls the specified receiving communication device to display a call request notification including a message and to delete the displayed call request notification after a predetermined time period,
wherein:
the message is a predetermined call request message,
the receiver specification section specifies a plurality of communication devices as receiving communication devices, the control section transmits the call request information to the plurality of the receiving communication devices specified by the receiver specification section, and when a call is received from any of the plurality of the communication devices to which the call request information is transmitted, the control section transmits cancel information which instructs canceling of the call request notification to the other receiving communication devices to which the call request information is transmitted.

2. The communication device according to claim 1, further comprising:
a time period setting section which sets a time period during which the call request notification is displayed by the receiving communication devices.

3. The communication device according to claim 1, further comprising:
a message setting section which sets the predetermined call request message.

4. The communication device according to claim 1, further comprising:
a cancel instruction section which inputs a cancel instruction of the call request notification,
wherein when the cancel instruction is input by the cancel instruction section, the control section transmits cancel information which instructs canceling of the call request notification to the receiving communication devices to which the call request information is transmitted.

5. The communication device according to claim 1, wherein the communication device is a telephone.

6. A communication system, comprising:
a plurality of communication devices which are connected to each other via a communication network,
wherein a first communication device among the plurality of the communication devices includes:
a receiver specification section which specifies a second communication device among the plurality of communication devices as a receiving communication device; and
a call request transmitting section which transmits, to the second communication device specified by the receiver specification section, call request information which controls the specified second communication device to display a call request notification including a message and to delete the displayed call request notification after a predetermined time period,
wherein:
the message is a predetermined call request message,
the second communication device includes an output section which, when the call request information is received from the first communication device, displays the call request notification and deletes the displayed call request notification after the predetermined time period,
the receiver specification section specifies a plurality of the second communication devices as receiving communication devices,
the call request transmitting section transmits the call request information to the plurality of the second communication devices specified by the receiver specification section, and
when a call is received from any of the plurality of the second communication devices, the call request transmitting section transmits cancel information which instructs canceling of the call request notification to the other second communication devices.

7. The communication system according to claim 6, wherein:

the first communication device includes a time period setting section which sets an output time period of the call request notification,
the call request transmitting section transmits information that instructs the output time period set by the time period setting section together with the call request information to the specified second communication devices, and
when the information that instructs the output time period is received together with the call request information from the first communication device, the output section displays the call request notification for the instructed output time period.

8. The communication system according to claim 6, wherein:
the first communication device includes a message setting section which sets the predetermined call request message,
the call request transmitting section transmits information indicating the predetermined call request message set by the message setting section together with the call request information to the specified second communication devices, and
when the information indicating the predetermined call request message is received together with the call request information from the first communication device, the output section displays the predetermined call request message based on the received information indicating the predetermined call request message.

9. The communication system according to claim 6, wherein the first communication device includes:
a cancel instruction section which inputs a cancel instruction of the call request notification; and
a cancel information transmitting section which transmits cancel information which instructs canceling of the call request notification to the specified second communication devices when the cancel instruction is input by the cancel instruction section, and
wherein the output section stops displaying the call request notification when the cancel information is received from the first communication device.

10. A non-transitory computer readable medium having stored thereon a program that is executable by a computer of a communication device to cause the computer to execute functions comprising:
specifying a receiving communication device; and
performing control to transmit, to the specified receiving communication device, call request information which controls the specified receiving communication device to display a call request notification including a message and to delete the displayed call request notification after a predetermined time period,
wherein the message is a predetermined call request message,
wherein, in the specifying, a plurality of second communication devices are specified as receiving communication devices,
wherein in the performing of the control, the call request information is transmitted to the plurality of the second communication devices specified in the specifying, and
wherein, in the performing of the control, when a call is received from any of the plurality of the second communication devices, cancel information which instructs canceling of the call request notification is transmitted to the other second communication devices.

* * * * *